(12) United States Patent
Kimura

(10) Patent No.: US 7,362,487 B2
(45) Date of Patent: Apr. 22, 2008

(54) OPTICAL ELEMENT AND OPTICAL SCANNING DEVICE USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 11/275,528

(22) Filed: Jan. 12, 2006

(65) Prior Publication Data
US 2006/0158972 A1    Jul. 20, 2006

(30) Foreign Application Priority Data
Jan. 19, 2005  (JP)  ............................. 2005-011713

(51) Int. Cl.
  *G02B 26/08*   (2006.01)
(52) U.S. Cl. ...................... 359/205; 347/259
(58) Field of Classification Search ............... None
See application file for complete search history.

(56) References Cited
FOREIGN PATENT DOCUMENTS

JP   2003-114316   4/2003
JP   2003-185955   7/2003

*Primary Examiner*—James Phan
(74) *Attorney, Agent, or Firm*—Fitzpatrick, Cella, Harper & Scinto

(57) ABSTRACT

Provided is an optical element capable of reducing Fresnel (surface) reflection on a lens surface which causes flare or ghost, an optical system including the optical element, and an optical scanning device including the optical element. The optical element includes: a plurality of two-dimensionally arranged subwave structures having an anti-reflection function, and in the optical element when directions orthogonal to each other within a plane including a tangent of a vertex of the optical surface are set as a first and second directions, each of distances between the subwave structures changes in at least one of the first and second directions, and an arbitrary subwave structure is located with a state in which a distance between the arbitrary subwave structure and one of the subwave structures closest to the arbitrary subwave structure is shorter than ½ of an average wavelength of the light beam incident on the optical surface.

14 Claims, 12 Drawing Sheets

0-TH ORDER PITCH ($\lambda=0.78$, N=1.524)

Lave=300nm $\theta=0$ D=160nm F=0.16-0.81

OPTICAL ELEMENT AND OPTICAL SCANNING DEVICE USING THE SAME

BACKGROUND OF THE INVENTION

1. Field of the Invention

The present invention relates to an optical element having an anti-reflection function and optical scanning device using the optical element. In particular, the present invention is suitable for an optical system of an image forming apparatus such as a laser beam printer, a digital copying machine, or a multifunction printer, which has, for example, an electrophotographic process, and employs a structure in which a light beam emitted from a light source means is deflected by an optical deflector (deflecting means) to optically scan a surface to be scanned through an imaging optical system. The optical system includes an optical element which has an fθ characteristic and in which a subwave structural grating is provided, thereby recording image information.

2. Related Background Art

In a conventional scanning optical apparatus such as a laser beam printer (LBP), a light beam modulated in accordance with an image signal and emitted from a light source means is periodically deflected by an optical deflector composed of, for example, a polygon mirror, and converged to form a spot shape on a photosensitive surface of a recording medium by an imaging optical system having an fθ characteristic to optically scan the photosensitive surface thereof, thereby performing image recording.

FIG. 16 is a cross sectional view showing a principal portion of a conventional optical scanning device in a main scanning direction (main scanning cross sectional view).

In FIG. 16, a light source means 91 is composed of, for example, a semiconductor laser. A collimator lens 92 converts a diverged light beam emitted from the light source means 91 into a substantially parallel light beam. An aperture stop 93 adjusts a quantity of a light beam passing therethrough to shape a beam form thereof. A cylindrical lens 94 has predetermined power in a sub-scanning direction and images the light beam passing through the aperture stop 93 on a deflecting surface (reflecting surface) 95a of an optical deflector 95 (described later) with respect to a sub-scanning section to thereby form a substantially linear image.

The optical deflector 95 serving as a deflecting means is composed of, for example, a polygon mirror having four surfaces (rotary polygon mirror) and rotated at constant speed by a driving means such as a motor (not shown) in a direction indicated by an arrow A.

An imaging optical system 96 has a condensing function and an fθ characteristic and is composed of two imaging lenses, that is, first and second imaging lenses 96a and 96b. The imaging optical system 96 images the light beam based on image information, which is reflected and deflected by the optical deflector 95, on a photosensitive drum surface 97 serving as a surface to be scanned. The imaging optical system 96 achieves an optical face tangle error correction function by bringing the deflecting surface 95a of the optical deflector 95 and the photosensitive drum surface 97 into a conjugate relationship in the sub-scanning section.

In FIG. 16, the diverged light beam emitted from the semiconductor laser 91 is converted into the substantially parallel light beam by the collimator lens 92. The quantity of the substantially parallel light beam passing through the aperture stop 93 is adjusted to shape the beam form thereof, and is then incident on the cylindrical lens 94. The substantially parallel light beam incident on the cylindrical lens 94 exits therefrom without changes in the main scanning section and is converged and imaged on the deflecting surface 95a of the optical deflector 95 to form the substantially linear image (linear image extended in the main scanning direction) in the sub-scanning section. The light beam reflected on and deflected by the deflecting surface 95a of the optical deflector 95 is imaged to form a spot shape on the photosensitive drum surface 97 through the first and second imaging lenses 96a and 96b. At this time, the optical deflector 95 is rotated in the direction indicated by the arrow A, so that the photosensitive drum surface 97 is optically scanned at constant speed in a direction indicated by an arrow B (main scanning direction). Thus, image recording is performed on the photosensitive drum surface 97 serving as a surface of a recording medium.

In recent years, an imaging optical system of an optical scanning device has been normally made of plastic with which an aspherical shape is easy to form and produce. However, in view of technical aspects and cost, it is difficult to apply an anti-reflection coat to a lens surface of a lens made of plastic. As a result, Fresnel reflection is caused on the lens surface.

FIG. 17 is an explanatory graph showing angle dependencies of reflectances of P-polarized light and S-polarized light in a case where a light beam is incident on a resin optical member whose refractive index (n) is, for example, 1.524.

As shown in FIG. 17, in each of the cases where the P-polarized light and the S-polarized light both have an incident angle of 0, the reflectance thereof is substantially 4.4%. In particular, the amount of surface reflection of the S-polarized light on each optical surface (lens surface) becomes larger as the incident angle thereof increases. Therefore, light reflected on a lens surface on which the anti-reflection coat is not applied is reflected on another optical surface to finally reach the surface to be scanned, resulting in ghost.

In particular, as shown in FIG. 16, when a lens surface 96a1 of the first imaging lens 96a which is relatively closer to the optical deflector 95 than the second imaging lens 96b is a concave shape and a light beam is substantially perpendicularly incident thereon, Fresnel reflection light on the lens surface 96a1 returns to the optical deflector 95, reflected on the deflecting surface (reflecting surface) 95a of the optical deflector 95 to pass through the imaging optical system 96, and turns into ghost light as reaching the surface to be scanned 97. The ghost light thus generated leads to, for example, a partial density difference, which deteriorates an image outputted from an image forming apparatus.

Therefore, in order to solve the above-mentioned problem, the applicant of the present application has proposed an optical element in which a subwave structural grating called a 0th order grating is provided on at least one optical surface of the imaging optical system and a grating shape of a surface of the subwave structural grating is set as appropriate to thereby obtain an anti-reflection effect (Japanese Patent Application Laid-open No. 2003-185955).

On the other hand, there has been proposed a method of setting a pitch of an uneven shape formed in a light incident surface such that diffraction light other than 0th order diffraction light on each of an incident side and an outgoing side of light which is made random and has a critical wavelength or more is made to be substantially zero, thereby easily producing an anti-reflection structure (Japanese Patent Application Laid-open No. 2003-114316).

With respect to the pitch of the uneven shape, Japanese Patent Application Laid-open No. 2003-114316 discloses about a distance between grating vertices aligned in a one-dimensional direction. However, an arrangement of two-dimensionally arranged gratings is not sufficiently disclosed. Although the gratings are arranged at random, a variation allowable range of the random arrangement is not sufficiently disclosed. No problem pertaining to form birefringence is disclosed, either. Japanese Patent Application Laid-open No. 2003-114316 discloses only the normal occurrence of the form birefringence.

In general, a periodical subwave structural grating, in which a grating pitch becomes small and thus is substantially equal to or shorter than a wavelength of light and has anisotropy in an arrangement direction, shows form birefringence in some cases. This corresponds to, for example, the case where a shape of a grating, in which subwave grooves are aligned in a first direction set along a groove, such as a wave grating, is significantly different from that in a second direction orthogonal to the first direction.

According to "Principle of Optics III", Tokai University Press, p 1030, when optically isotropic materials are regularly arranged as particles, each being sufficiently larger than a molecule and smaller than a wavelength of light, the optically isotropic materials act to cause the form birefringence. That is, a model such as a thin parallel plate assembly having periodicity of the order of wavelength or less as described in "Principle of Optics III" becomes a uniaxial crystal in which an effective dielectric constant obtained from a dielectric constant of a medium of a plate portion and a dielectric constant of a medium of a non-plate portion behaves differently on an electrical vector parallel to the plate portion and an electrical vector perpendicular to the parallel portion.

In other words, the subwave structural grating, whose grating pitch is substantially equal to or shorter than the wavelength of light, shows a dielectric constant differently on two axes, that is, a grating arrangement direction and a direction perpendicular to the grating arrangement direction, according to a direction of a polarization plane of an incident beam. However, the grating which shows the dielectric constant differently on the two axes, that is, the grating arrangement direction and the direction perpendicular to the grating arrangement direction, cannot obtain a sufficient anti-reflection effect.

For example, when a light beam is perpendicularly incident on an optical element, an anisotropy medium shows the same transmission and reflection properties on two polarized beams orthogonal to each other. However, a form birefringent element or a uniaxial crystal shows the transmission and reflection properties completely different on the two polarized beams orthogonal to each other.

SUMMARY OF THE INVENTION

An object of the present invention is to provide an optical element capable of reducing Fresnel (surface) reflection on a lens surface to be a cause of flare or ghost, an optical system including the optical element, and an optical scanning device including the optical element.

Another object of the present invention is to provide an optical element capable of reducing Fresnel reflection on the lens surface without further performing an additional process such as coating, an optical system including the optical element, and an optical scanning device including the optical element.

According to one aspect of the invention, an optical element includes a plurality of subwave structures which have an anti-reflection function for a light beam incident on an optical surface and are two-dimensionally arranged, and in the optical element, when directions orthogonal to each other within a plane including a tangent line of a vertex of the optical surface are set as a first direction and a second direction, each of distances between the subwave structures changes in at least one of the first direction and the second direction, and an arbitrary subwave structure of the subwave structures is located with a state in which a distance between the arbitrary subwave structure and one of the subwave structures which is closest to the arbitrary subwave structure is shorter than ½ of an average wavelength of the light beam incident on the optical surface, and also in the optical element, in a case where distances between the arbitrary subwave structure and n subwave structures selected in an increasing order of the distance from the arbitrary subwave structure to each of the n subwave structures are Li (i=1 to n), a minimum wavelength of the light beam incident on the optical surface is λ, a refractive index of a medium of a subwave structure located on an incident side of the optical surface is Ni, a refractive index of a medium of a subwave structure located on an exit side of the optical surface is Ns, an incident angle of the light beam incident on the optical surface is θi, and a standard deviation of the distances Li (i=1 to n) is Lσ, when a relationship $$Lave = \sum_{i=1}^{n} Li/n$$

is used, conditions $Lave < \lambda/(Ns + Ni \cdot \sin \theta i)$ $L\sigma \leq 80$ (nm)

are satisfied.

According to a further aspect of the invention, in the optical element, each of the subwave structures has one of a convex shape or a convex shape.

According to another aspect of the invention, an optical element includes a plurality of subwave structures which have an anti-reflection function for a light beam incident on an optical surface and are two-dimensionally arranged, and in the optical element, when directions orthogonal to each other within a plane including a tangent line of a vertex of the optical surface are set as a first direction and a second direction, each of distances between the subwave structures changes in at least one of the first direction and the second direction and an arbitrary subwave structure of the subwave structures is located with a state in which a distance between the arbitrary subwave structure and one of the subwave structures which is closest to the arbitrary subwave structure is shorter than ½ of an average wavelength of the light beam incident on the optical surface, and in the optical element, in the case where distances between the arbitrary subwave structure and n subwave structures selected in an increasing order of the distance from the arbitrary subwave structure to each of the n subwave structures are Li (i=1 to n), a cross sectional area of the arbitrary subwave structure with respect to an arbitrary cutting plane parallel to the plane including the tangent line of the vertex of the optical surface is S0, cross sectional areas of the n subwave structures are Si (i=1 to n), and a standard deviation of the distances Li (i=1 to n) is Lσ, when the following relationships $$Save = \sum_{i=0}^{n} Si/(n+1)$$

$$Lave = \sum_{i=1}^{n} Li/n$$

are used, conditions $0.16 \leq Save/(K \times (Lave)^2) \leq 0.81$ $L\sigma \leq 80$ (nm)

are satisfied, where K denotes a constant and satisfies $0.87 \leq K \leq 1.0$.

According to a further aspect of the invention, in the optical element, each of the subwave structures has one of a convex shape and a concave shape and the arbitrary cutting plane is a cutting plane located at an intermediate position between a top surface and a bottom surface of the one of the convex shape and the concave shape.

According to a further aspect of the invention, in the optical element, n is a number in a range of 4 to 6.

According to a further aspect of the invention, in the optical element, a cross sectional shape of the arbitrary subwave structure which includes a normal to the vertex of the optical surface and is obtained by cutting in the first direction is identical to or substantially identical to a cross sectional shape of the arbitrary subwave structure which includes the normal to the vertex of the optical surface and is obtained by cutting in the second direction.

According to a further aspect of the invention, in the optical element, the subwave structures include subwave structures in which cross sectional areas thereof with respect to a cutting plane parallel to the plane including the tangent line of the vertex of the optical surface are not equal to one another.

According to a further aspect of the invention, in the optical element, the light beam incident on the optical surface of the optical element is predetermined polarized light and a polarization direction of the polarized light is aligned with or substantially aligned with one of the first direction and the second direction.

According to another aspect of the invention, an optical scanning device includes:
   light source means;
   deflecting means;
   an incident optical system for guiding light beam emitted from the light source means to the deflecting means; and
   an imaging optical system for guiding the light beam from the deflecting means to a surface to be scanned,
   and in the optical scanning apparatus, at least one of the incident optical system and the imaging optical system includes the optical element set out in the foregoing.

According to a further aspect of the invention, in the optical scanning device, the light beam emitted from the light source means is linearly polarized light and an oscillation wavelength of the light beam is in a range of 400 nm to 850 nm.

According to another aspect of the invention, an image forming apparatus includes:
   the optical scanning device set out in the foregoing;
   a photosensitive member located on the surface to be scanned;
   a developing device for developing, as a toner image, an electrostatic latent image formed on the photosensitive member scanning with light beam by the optical scanning device;
   a transferring device for transferring the developed toner image to a material to be transferred; and
   a fixing device for fixing the transferred toner image to the material to be transferred.

According to another aspect of the invention, an image forming apparatus includes:
   the optical scanning device set out in the foregoing; and
   a printer controller for converting code data inputted from an external device into an image signal and outputting the image signal to the optical scanning device.

According to another aspect of the invention, a color image forming apparatus includes a plurality of image bearing members which are arranged on the respective surface to be scanned in the optical scanning device set out in the foregoing and form different color images.

According to a further aspect of the invention, the color image forming apparatus, further includes a printer controller for converting a color signal inputted from an external device into different color image data and outputting the color image data to the optical scanning devices.

According to the present invention, by applying the optical element, in which the subwave structural grating having an anti-reflection function associated with the incident angle of the light beam is provided, to the imaging optical system or/and the incident optical system, it is possible to achieve an optical element capable of reducing Fresnel (surface) reflection on a lens surface to be a cause of flare or ghost, an optical system including the optical element, and an optical scanning device including the optical element.

In addition, according to the present invention, it is possible to achieve an optical element capable of reducing Fresnel reflection on the lens surface, to be a cause of flare or ghost, without further performing an additional process such as coating, and thus making a light intensity distribution on the surface to be scanned uniform, an optical system including the optical element, and an optical scanning device including the optical element.

DETAILED DESCRIPTION OF THE PREFERRED EMBODIMENTS

Hereinafter, embodiments of the present invention will be described with reference to the accompanying drawing.

Embodiment 1

An optical element according to the present invention is an optical element in which a subwave structural grating is provided on at least one optical surface. The subwave structural grating has an anti-reflection function associated with an incident angle of a light beam.

The optical element according to the present invention is applicable to various optical systems such as an image taking system, a projection system, and an image forming system, in which the incident angle is changed from a center portion of the element to a peripheral portion thereof.

Figure 1:
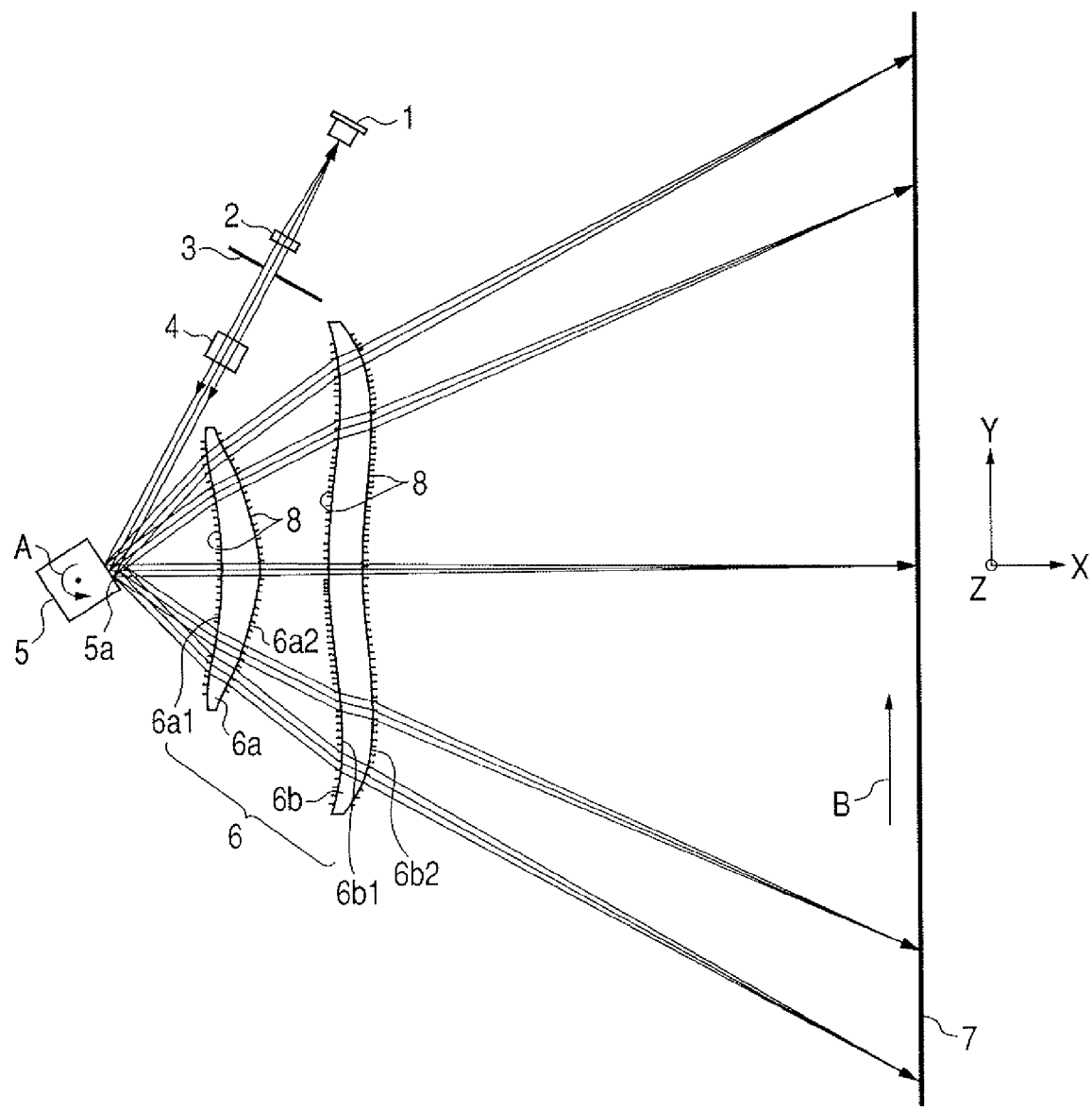
FIG. 1 is a cross sectional view in a main scanning section according to Embodiment 1 of the present invention.

Next, Embodiment 1 in which the optical element according to the present invention is applied to an optical scanning device will be described with reference to FIGS. 1 to 6. FIG. 1 is a cross sectional view of a principle part of the optical scanning device in a main scanning direction (main scanning sectional view) according to Embodiment 1 of the present invention. In FIG. 1, a Y-axis is set in a scanning direction of a surface to be scanned 7, an X-axis is set in a direction perpendicular to the Y-axis on the paper plane of FIG. 1, and a Z-axis is set in a direction perpendicular to the X-axis and the Y-axis (perpendicular to the paper plane). A main scanning section corresponds to the paper plane (XY section) and a sub-scanning section corresponds to a plane perpendicular to the paper plane including an optical axis of an imaging optical system 6 (XZ section). The main scanning direction is a Y-axis direction and a sub-scanning direction is a Z-axis direction.

In FIG. 1, a light source means (semiconductor laser) 1 is composed of, for example, an infrared laser whose wavelength λ is 780 nm. In addition to the infrared laser, a red laser whose wavelength λ is 670 nm may be used. A blue-violet laser (408 nm in wavelength) may be used.

In the present invention, it is preferable that an oscillation wavelength of a light beam emitted from the light source means (semiconductor laser) be in a range of 400 (nm) to 850 (nm) in view of resolutions of a laser beam printer and a digital copying machine.

A condensing lens (collimator lens) 2 converts a diverged light beam emitted from the light source means 1 into a substantially parallel light beam or a substantially converged light beam.

An aperture stop 3 adjusts a quantity of the light beam passing through the collimator lens 2 to shape a beam form thereof.

A lens system (cylindrical lens) 4 has predetermined power in only the sub-scanning direction and images the light beam passing through the aperture stop 3 on a deflecting surface (reflecting surface) 5a of an optical deflector 5 (described later) within the sub-scanning section to form a substantially linear image.

Note that each of components such as the collimator lens 2 and the cylindrical lens 4 is a component of an incident optical system. The collimator lens 2 and the cylindrical lens 4 may be integrally formed.

The optical deflector 5 serving as a deflecting means is composed of, for example, a polygon mirror having four surfaces, each of which is the deflecting surface 5a (rotary polygon mirror). The optical deflector 5 is rotated at constant speed by a driving means such as a motor (not shown) in a direction indicated by an arrow A in FIG. 1.

An imaging optical system 6 has a condensing function and an fθ characteristic and is composed of first and second imaging lenses (imaging element) 6a and 6b, each of which is made of a plastic material (transparent resin material). The imaging optical system 6 images the light beam based on image information, which is reflected and deflected by the optical deflector 5 on the surface to be scanned 7. The imaging optical system 6 achieves an optical face tangle error correction function for the deflecting surface 5a by bringing the deflecting surface 5a of the optical deflector 5 and the surface to be scanned 7 into a conjugate relationship in the sub-scanning section.

In this embodiment, each of lens surfaces of the two first and second imaging lenses 6a and 6b has an aspherical or spherical shape as a base shape in the main scanning section shown in FIG. 1. In addition, each of the lens surfaces has a known special aspherical shape as the base shape in the sub-scanning section perpendicular to the main scanning section. In the known special aspherical shape, a curvature is changed from an on-axis (scanning center) to an off-axis (scanning periphery).

In this embodiment, a subwave structural grating 8 which is made of a transparent resin material or a glass material (described later) is formed in each of an entire incident surface 6a1 of the first imaging lens 6a, an entire exit surface 6a2 thereof, an entire incident surface 6b1 of the second imaging lens 6b, and an entire exit surface 6b2 thereof.

The subwave structural grating 8 has an anti-reflection function associated with an incident angle of a light beam which is incident on an imaging lens. Therefore, reflection light on a lens surface of the imaging optical system 6 is prevented from entering the surface to be scanned 7.

Reference numeral 7 denotes a photosensitive drum surface as the surface to be scanned.

In this embodiment, the diverged light beam emitted from the semiconductor laser 1 is converted into the substantially parallel light beam by the collimator lens 2. The quantity of the light beam passing through the aperture stop 3 is adjusted thereby to shape the beam form thereof and then incident on the cylindrical lens 4. Of the substantially parallel light beam incident on the cylindrical lens 4, a light beam in the main scanning section exits therefrom without change. In addition, a light beam in the sub-scanning section is converged and imaged on the deflecting surface 5a of the optical deflector 5 to form the substantially linear image (linear image extended in the main scanning direction). The light beam which is reflected on and deflected by the deflecting surface 5a of the optical deflector 5 is imaged with a spot shape on the surface to be scanned 7 through the first and second imaging lenses 6a and 6b. At this time, the optical deflector 5 is rotated in the direction indicated by the arrow A. Therefore, the surface to be scanned 7 is optically scanned at constant speed in a direction indicated by an arrow B (main scanning direction). Thus, image recording is performed on the surface to be scanned 7 corresponding to a surface of a recording medium.

In this embodiment, the semiconductor laser 1 serving as the light source is disposed such that the light beam is incident as substantially P-polarized light on the imaging optical system 6. In other words, the semiconductor laser 1 is disposed such that a lateral transverse mode direction thereof becomes substantially parallel to the surface to be scanned 7.

Figure 2:
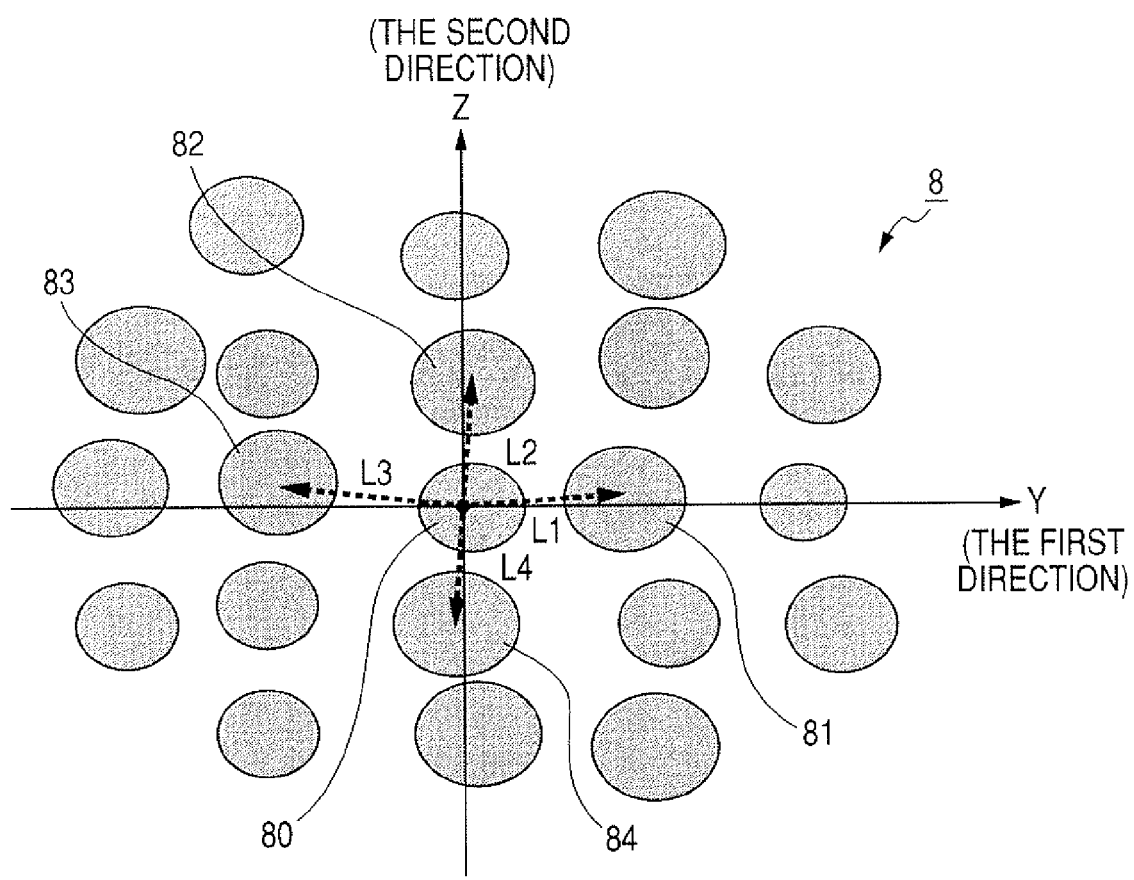
FIG. 2 is a cross sectional view of a principal part of a subwave structural grating according to Embodiment 1 of the present invention.
Figure 3:
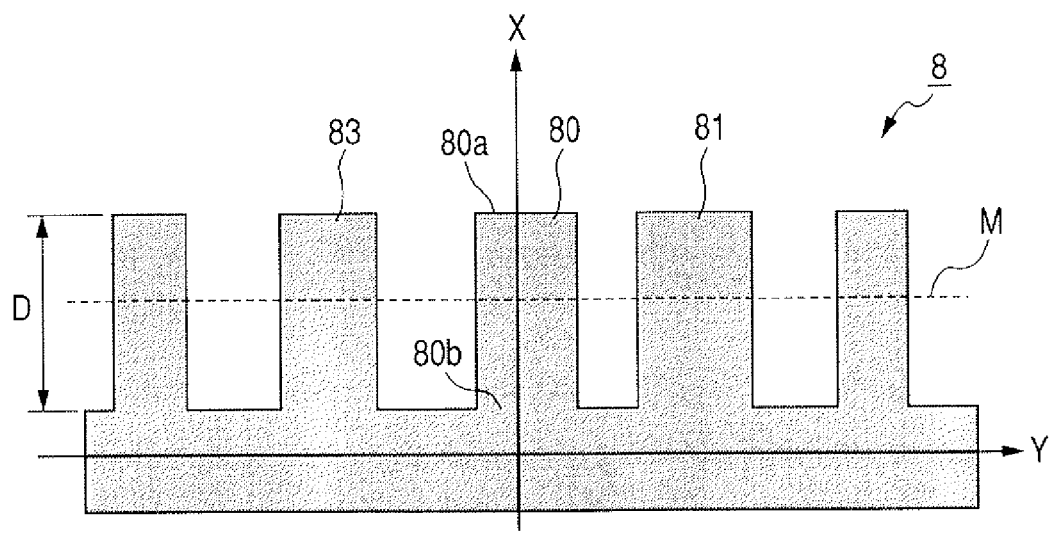
FIG. 3 is a cross sectional view of the principal part of the subwave structural grating according to Embodiment 1 of the present invention.

In this embodiment, as described above, in the imaging optical system 6, each of the entire incident surface 6a1 of the first imaging lens 6a, the entire exit surface 6a2 thereof, the entire incident surface 6b1 of the second imaging lens 6b, and the entire exit surface 6b2 thereof has special aspherical shape as the base shape and the subwave structural grating 8 as shown in FIGS. 2 and 3 is formed on each of the surfaces.

Therefore, reflectance (and transmittance) can be arbitrarily controlled in this embodiment. Thus, Fresnel (surface) reflection caused on each of the incident surface 6a1 of the first imaging lens 6a in the imaging optical system 6, the exit surface 6a2 thereof, the incident surface 6b1 of the second imaging lens 6b therein, and the exit surface 6b2 thereof is suitably adjusted to prevent a multi-reflection light beam generated between the two imaging lenses from reaching the surface to be scanned 7, thereby reducing flare and ghost which reach the surface to be scanned 7.

FIG. 2 is an enlarged view of the exit surface 6a2 of the first imaging lens 6a as viewed from the surface to be scanned 7 side and FIG. 3 is a cross sectional view of a principal part thereof obtained by cutting along the Y-axis shown in FIG. 2.

In each of FIGS. 2 and 3, coordinate systems X, Y, and Z are set for an arbitrary subwave structure 80. Assume that an arrangement direction corresponding to a first direction based on the subwave structure 80 is a Y-direction. In addition, assume that an arrangement direction corresponding to a second direction which is perpendicular to the arrangement direction corresponding to the first direction and set on the same paper plane of FIG. 2 is a Z-direction. An optical surface is a Y-Z plane and a normal to the optical surface at a surface vertex becomes an X-direction.

The arbitrary subwave structure 80 is made of the same material as that of the first imaging lens 6a and has a convex shape of substantially a cylinder. The subwave structure 80 may be formed in a concave shape.

Here, assume that a height of the convex shape of substantially the cylinder is D. A diameter of substantially the cylinder changes depending on each subwave structure.

Because the subwave structure 80 is substantially the cylinder, a cross section thereof obtained by cutting along the Y-direction corresponding to the first direction becomes a rectangular shape as shown in FIG. 3. In addition, a cross section of the subwave structure 80 (not shown) obtained by cutting along the Z-direction corresponding to the second direction becomes the rectangular shape as that shown in FIG. 3.

With respect to the arbitrary subwave structure 80 of this embodiment, each of a shape of the cross section thereof obtained by cutting along the first direction and a shape of the cross section thereof obtained by cutting along the second direction is the rectangular shape and those shapes are identical to or substantially identical to each other. Therefore, the subwave structure 80 has a substantially rotational symmetrical shape.

As shown in FIG. 2, respective subwave structures are substantially two-dimensionally arranged in the Y-direction and the Z-direction without interdependence between the Y-direction and the Z-direction. As is apparent from FIG. 2, a distance between adjacent subwave structures is not constant but varies. Because each of the subwave structures has the convex shape of substantially the cylinder, each of the cross sections of the subwave structures which are obtained by simultaneous cutting parallel to the optical surface becomes substantially circular. However, as described above, because the diameter of substantially the cylinder changes depending on each subwave structure, cross sectional areas of the respective subwave structures are not equal to one another.

In this embodiment, as shown in FIG. 2, n (n=4 in this embodiment) adjacent subwave structures (hereinafter also referred to as "adjacent subwave structures") 81, 82, 83, and 84 which are selected in a short distance order with respect to the arbitrary subwave structure 80 are two-dimensionally arranged in the Y-direction and the Z-direction.

Assume that distances between the arbitrary subwave structure 80 and the respective adjacent subwave structures 81, 82, 83, and 84 are L1, L2, L3, and L4. Distances between barycentric positions of the adjacent subwave structures 81, 82, 83, and 84 are measured. As is apparent from FIG. 2, L1≠L2, L3≠L4, L1≠L4, and L2≠L3. In addition, the first direction and the second direction are separately set without interdependence. In this embodiment, because L1≠L3 in the first direction, the distances in the first direction are not equal to each other. In addition, because L2≠L4 in the second direction, the distances in the second direction are not equal to each other.

Here, assume that distances between the arbitrary subwave structure 80 and the four adjacent subwave structures 81, 82, 83, and 84 which are selected in the short distance order based thereon are Li (i=1 to n, n=4 in this embodiment), a minimum wavelength of an incident light beam is $\lambda$, an refractive index of a medium located on an incident side of an optical surface is Ni, an refractive index of a medium located on an exit side of the optical surface is Ns, an incident angle of the light beam incident on the optical surface is $\theta i$, and a standard deviation of the distances Li (i=1 to n) is L$\sigma$, $$Lave = \sum_{i=1}^{n} Li/n$$

is used, the following conditions are satisfied.

$$Lave < \lambda/(Ns+Ni\cdot\sin\theta i) \quad (1)$$

$$L\sigma \leq 80 \text{ (nm)} \quad (2)$$

The standard deviation is obtained by calculating a variation of distances Li using a statistical method. The right-hand side of the conditional expression (1) indicates a condition for a so-called 0th order grating.

The 0th order grating is normally a grating in which diffraction light other than 0th order light is not generated in a periodical subwave structure in which a grating distance (pitch) is constant (see Optical Society of America, Vol. 11, No. 10, October 1994, J. Opt. Soc. Am. A, p 2695).

The subwave structure is referred to as "SWS" and its grating pitch is equal to or shorter than the order of wavelength of a used light source. The grating pitch is shorter than that of a normal diffraction grating by one or two orders, so such a subwave structure is used for the 0th order light without a diffraction function.

In general, in a periodical structural grating, diffraction light is generated at a diffraction angle satisfying the following diffraction conditional expression, $$P(Ns\cdot\sin\theta m - Ni\cdot\sin\theta i) = m\lambda \quad (a),$$

where P represents grating pitch, Ni represents refractive index (of medium of structural grating) on incident side, $\theta i$ represents incident angle, $\theta m$ represents m-th order diffraction angle, Ns represents refractive index (of medium of structural grating) on exit side, m represents diffraction order, and $\lambda$ represents used wavelength. Although it is apparent from the conditional expression (a), the diffraction angle $\theta m \geq \theta_1$. According to Optical Society of America, a condition in which +1-th order diffraction light is not generated is $$\theta_{+1} \geq 90° \quad (b).$$

Therefore, a condition for the 0th order grating is $$P < \lambda/(Ns+Ni\cdot\sin\theta) \quad (c).$$

Figure 4:
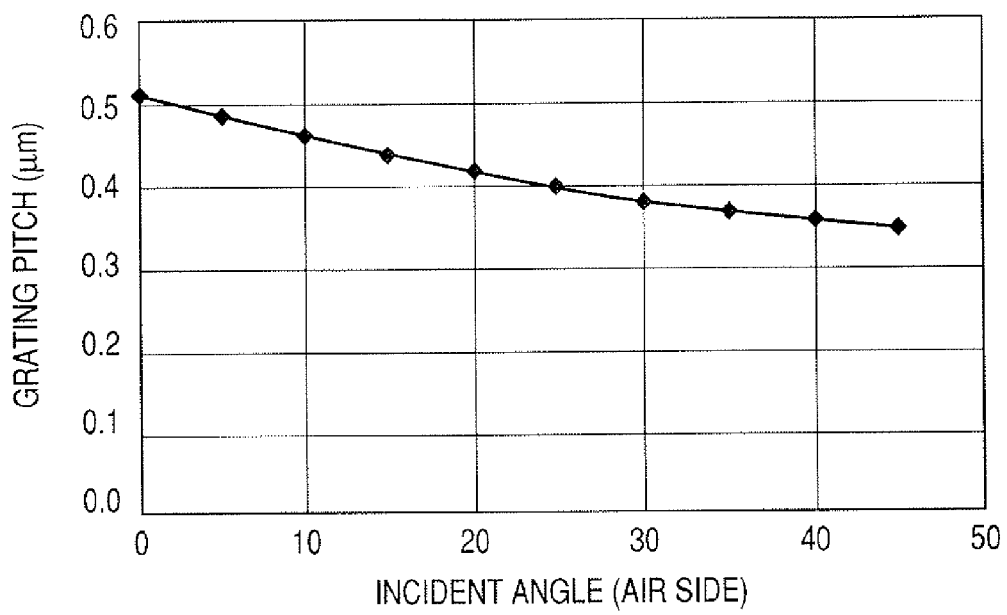
FIG. 4 is a graph showing a relationship between a grating pitch and an incident angle according to Embodiment 1 of the present invention.

FIG. 4 is an explanatory graph showing a relationship between the incident angle $\theta i$ and the grating pitch P in the case where a refractive index (n) of a lens material is 1.524 and a used wavelength ($\lambda$) is 780 (nm). This graph shows a maximum grating pitch satisfying the 0th order grating. When a grating pitch is equal to or shorter than the maximum grating pitch, the diffraction light other than the 0th order light is not generated. As is apparent from this graph, in the case where the incident angle $\theta i$ is zero, that is, the case of normal incidence, when the grating pitch P of the subwave structural grating is 0.5 µm, it acts as the 0th order grating. However, in the case where the incident angle $\theta i$ is 45°, when the grating pitch P of the subwave structural grating is 0.5 µm, the condition for the 0th order grating is not satisfied. As is apparent from the graph, it is necessary that the grating pitch P of the 0th order grating is shorter than 0.35 µm in the case where the incident angle $\theta i$ is 45°.

The incident angle $\theta i$ is defined as an angle formed between a normal (X-direction) to the optical surface (Y-Z plane) and a principal ray of an incident light beam in the main scanning section.

In the optical scanning device as described in this embodiment, the incident angle $\theta i$ of an incident light beam is determined in a position y on each of the lens surfaces of the imaging optical system 6, that is, the incident surface 6a1 of the first imaging lens 6a, the exit surface 6a2 thereof, the incident surface 6b1 of the second imaging lens 6b, and the exit surface 6b2 thereof, of the lenses. Therefore, the maximum grating pitch satisfying the 0th order grating can be determined in each position on each of the lens surfaces.

In order words, when a grating pitch determined in the case where a maximum incident angle of a light beam incident on a subwave structure grating surface is expressed by $\theta y max$ is expressed by Pymax, the subwave structural grating 8 having the grating pitch satisfying the following condition may be formed.

$$P < Pymax \quad (d)$$

Therefore, when the maximum incident angle $\theta y max$ is set to 45°, Pymax is nearly equal to 0.35 µm, so that the grating pitch P equal to or shorter than this pitch may be selected.

On the other hand, in the subwave structural grating according to this embodiment as shown in FIGS. 2 and 3, the distance between the adjacent subwave structures is not constant as described above.

Thus, in this embodiment, an average value (average distance) Lave of the respective distances L1, L2, L3, and L4 between the arbitrary subwave structure 80 and the adjacent subwave structures 81, 82, 83, and 84 is substituted for the grating pitch P of a periodical grating which is constant to obtain the conditional expression (1).

$$Lave = \sum_{i=1}^{n} Li/n$$

When the conditional expression (1) is examined, the following can be understood. A denominator of the right-hand side of the conditional expression (1), that is, (Ns+Ni·sin $\theta i$) becomes (Ns+sin $\theta i$) if the refractive index Ni of the medium (air) located on the incident side is set to 1. In view of the point that the practical incident angle $\theta i$ is nearly equal to 45° and the refractive index Ns of a glass material is nearly equal to about 1.5, the conditional expression (1) substantially becomes $$Lave < \lambda/2.$$

Therefore, a minimum value of the distance Li may be smaller than $\lambda/2$.

The above-mentioned conditional expression (2) specifies the standard deviation $L\sigma$ of the distances Li (i=1 to n). When the conditional expression (2) is not satisfied, a preferable reflectance characteristic cannot be obtained.

The above-mentioned conditional expression (2) may be more desirably set as follows.

$$L\sigma \leq 60 \text{ (nm)} \quad (2a)$$

A lower limit value of $L\sigma$ is determined based on processing precision. Although an ideal value for the lower limit value of $L\sigma$ is zero, a substantial relationship of 10 (nm) $\leq L\sigma$ is experimentally known.

Next, the cross sectional area of the subwave structure obtained by section parallel to the optical surface will be described with reference to FIGS. 2, 3, 4, and 5.

Assuming that the arbitrary subwave structure 80 and the four adjacent subwave structures 81, 82, 83, and 84 which are selected in the short distance order based thereon are cut with respect to a cutting plane which is parallel to the optical surface and located at an intermediate height M (broken line of FIG. 3) between a highest portion (top surface) 80a of the arbitrary subwave structure 80 and a lowest portion (bottom surface) thereof 80b. In this case, assume that a cross sectional area of the arbitrary subwave structure 80 is S0, cross sectional areas of the n adjacent subwave structures 81, 82, 83, and 84 are Si (i=1 to n, n=4 in this embodiment), and a standard deviation of the distances Li (i=1 to n) is Lσ, and when the following expressions, $$Save = \sum_{i=0}^{n} Si/(n+1)$$

$$Lave = \sum_{i=1}^{n} Li/n$$

are used, the following conditions are satisfied.

$$0.16 \leq Save/(K \times (Lave)^2) \leq 0.81 \quad (3)$$

$$L\sigma \leq 80 \text{ (nm)} \quad (2)$$

where K denotes a constant and satisfies the following condition.

$$0.87 \leq K \leq 1.0$$

Note that the constant K of this embodiment is 1.00.

A denominator of the right-hand side of the conditional expression (3) is $(K \times (Lave)^2)$ and K is 1.00, so the denominator indicates an area surrounded by a rectangle formed by lines corresponding to the distances between the adjacent subwave structures, that is, a unit area in the case where convex portions of the subwave structures and concave portions located around the convex portions are combined. As is apparent from FIG. 2, when the subwave structures are arranged in a substantially rectangular shape, a convex portion of a subwave structure is substantially located within an area surrounded by a rectangle formed by lines corresponding to the distances between the adjacent subwave structures, that is, the unit area. When the right-hand side of the conditional expression (3) is expressed by $$F = Save/(K \times (Lave)^2),$$

F indicates an area ratio of a subwave structural region located on the optical surface. Hereinafter, the area ratio F is referred to as an "average grating area ratio".

Figure 5:
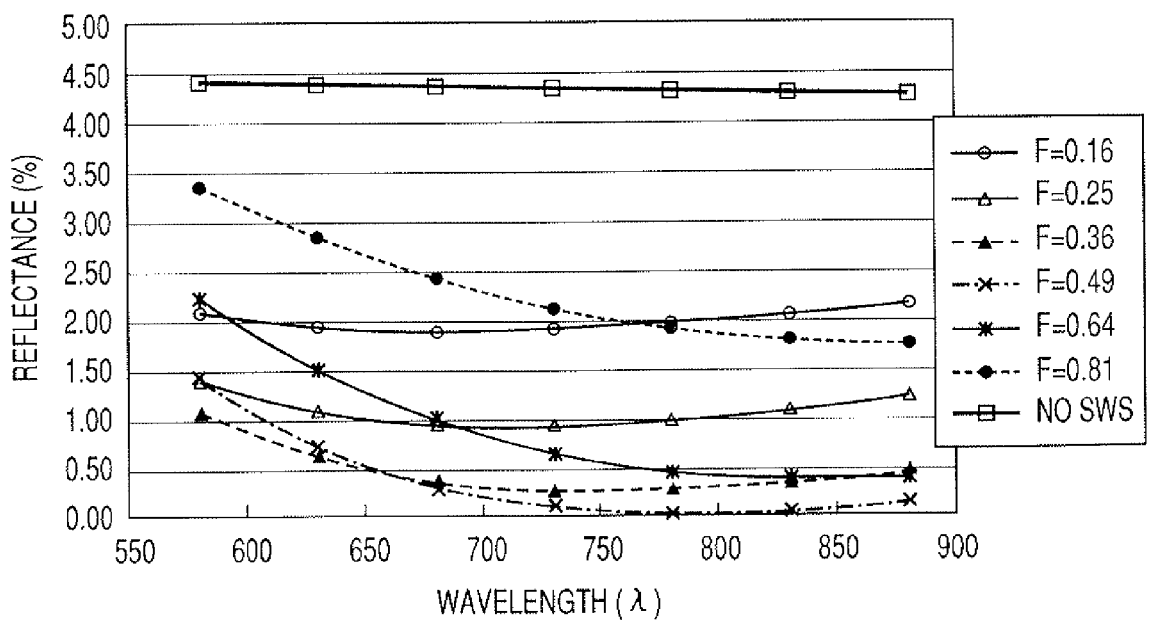
FIG. 5 is a graph showing a relationship between reflectance and the incident angle according to Embodiment 1 of the present invention.

Now, assume that a used wavelength λ is 780 nm, a height D of a subwave structure is 160 nm, a light beam incident angle θ is 0°, polarized light of an incident light beam is P-polarized light, the average value (average distance) Lave of the distances between the adjacent subwave structures is 300 (nm), and a refractive index of a glass material is 1.524. In such a case, a result obtained by calculating reflectance 0th order light in the subwave structural grating surface using rigorous coupled wave analysis (RCWA) based on the average grating area ratio F is shown in FIG. 5. Here, for the purpose of simplification, the distance between the adjacent subwave structures is set to 300 (nm) and a variation in distances is assumed to be extremely small (the case where there is a variation will be described later). Although the details are omitted here, the height D of the subwave structure which is set to 160 (nm) is a result which is obtained by optimization such that the reflectance becomes minimal in the vicinity of the used wavelength λ of 780 (nm). When the used wavelength λ changes, the height D of the subwave structure may be optimized as appropriate.

In FIG. 5, the reflectance in the case where there are no subwave structures is about 4.4%. On the other hand, in this embodiment, when the above-mentioned conditional expression (3) is satisfied, the reflectance is 2% in the vicinity of λ=780 (nm), so that the reflectance can be reduced by half.

The above-mentioned conditional expression (3) may be more desirably set as follows.

$$0.25 \leq F \leq 0.64 \quad (3a)$$

When the conditional expression (3a) is satisfied, the reflectance can be reduced to about 1% in a range of λ from 650 (nm) to 850 (nm).

Here, the reason why the constant K is set to 1.00 is that n=4. In the case of n=5, K becomes nearly equal to 0.93. In the case of n=6, K becomes nearly equal to 0.87. These values can be obtained using simple geometric calculation.

In a first case of FIG. 1, assume that a polarization plane of a light beam (laser light) emitted from the semiconductor laser 1 is parallel to the paper plane of FIG. 1, that is, the X-Y plane. At this time, a light beam incident on the optical deflector 5 is P-polarized light with respect to the optical deflector 5. Then, the light beam is polarized on the imaging optical system 6. In other words, the light beam is polarized in the Y-axis direction on the subwave structural grating 8 shown in FIG. 2, that is, the arrangement direction corresponding to the first direction thereon.

In another case, the polarization plane of the light beam emitted from the semiconductor laser 1 may be perpendicular to the paper plane of FIG. 1, that is, the Y-Z plane. At this time, the light beam incident on the optical deflector 5 is S-polarized light with respect to the optical deflector 5. Then, the light beam is polarized on the imaging optical system 6. In other words, the light beam is polarized in the Z-axis direction on the subwave structural grating 8 shown in FIG. 2, that is, the arrangement direction corresponding to the second direction thereon.

Figure 6:
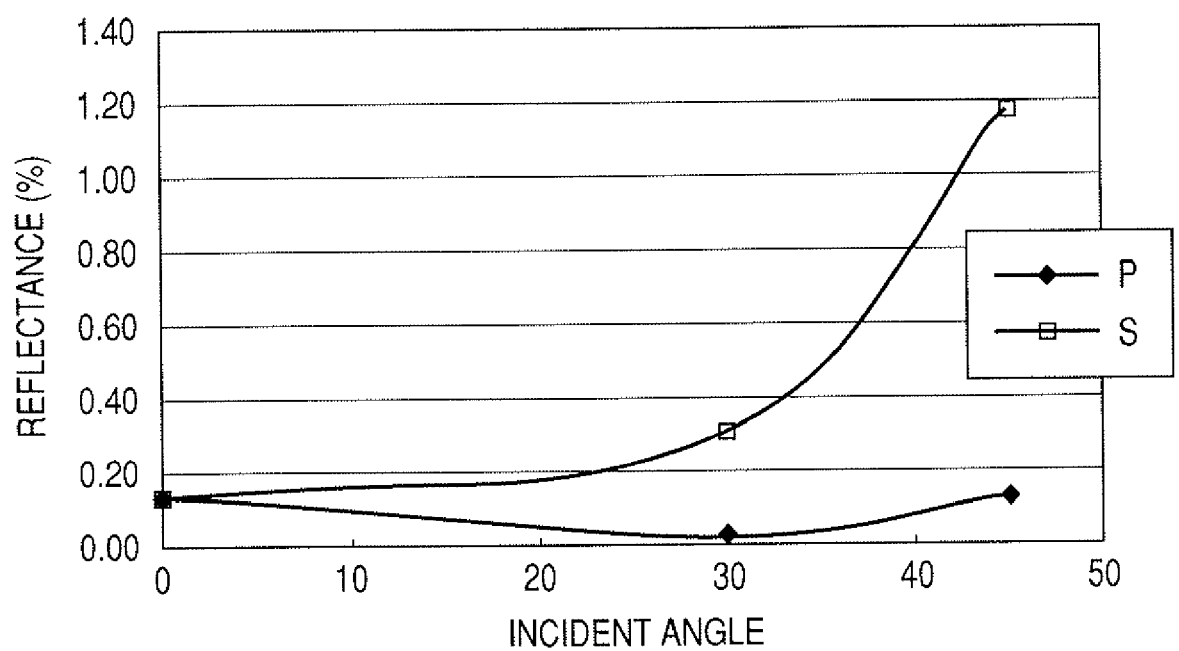
FIG. 6 is a graph showing a relationship between the reflectance and the incident angle according to Embodiment 1 of the present invention.
Figure 17:
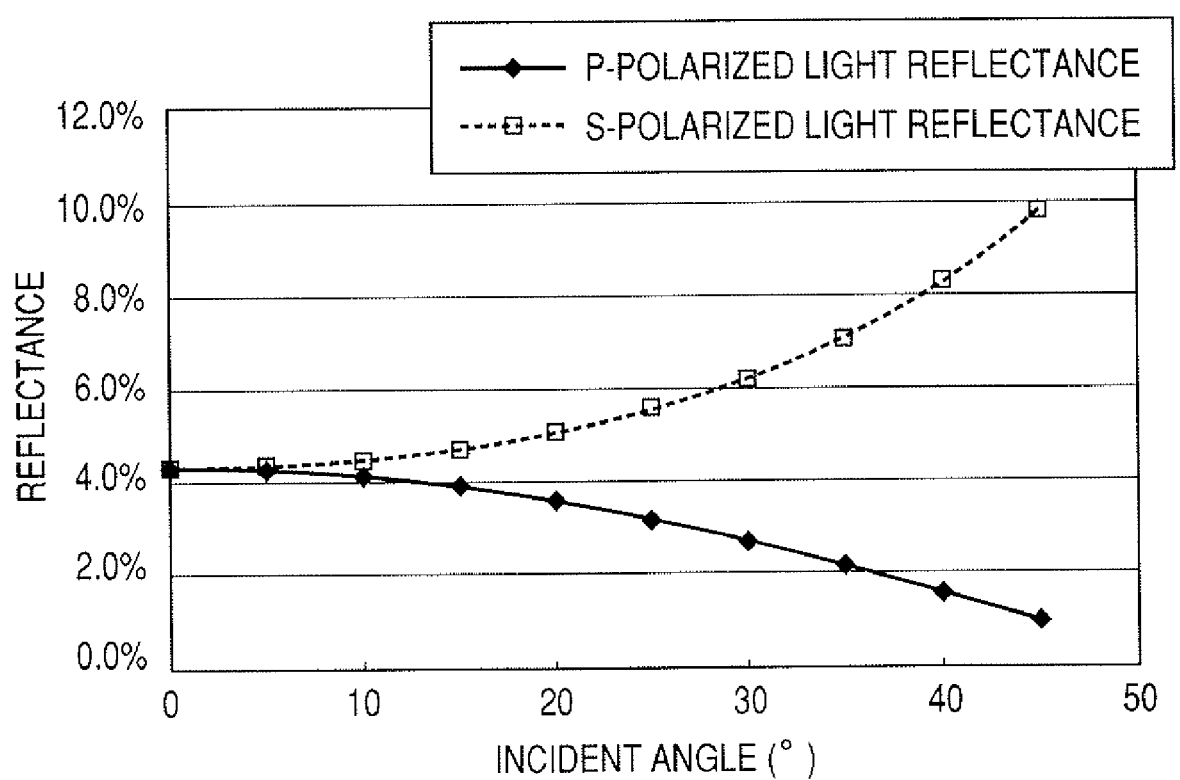
FIG. 17 is a graph showing a relationship between an incident angle and reflectance.

In each of the cases, a result obtained by calculating a change in reflectance which is caused when an incident angle of a light beam incident on the subwave structural grating 8 on the imaging optical system 6 changes is shown in FIG. 6. In this calculation, the average value Lave of the distances between the adjacent subwave structures is set to 300 (nm), the grating height D is set to 160 nm, and the average grating area ratio F is set to 0.56. As is apparent from FIG. 6, in the case of each of the P-polarized light and the S-polarized light, the reflectance is about 0.3% or less at an incident angle of 0 degrees to 30 degrees. In addition, the reflectance is about 1.2% or less at an indigent angle of 0 degrees to 45 degrees. This result shows that the reflectance is reduced to about a level of 1/10 of the result shown in FIG. 17.

In addition to this, it is possible to obtain a high-precision anti-reflection function without depending on incident polarized light. When particularly the incident angle is zero in FIG. 6, characteristics of the two polarized light (S-polarized light and P-polarized light) orthogonal to each other are identical to each other. If there is form birefringence, the characteristics of the S-polarized light and the P-polarized light are not identical to each other at an incident angle of zero. Even in the case of another incident angle, the characteristics are significantly different from each other.

Although described above, the reason why the form birefringence of this embodiment does not occur is as follows. The shape of the cross section of the arbitrary subwave structure 80 which is obtained by cutting along the first direction is identical to or substantially identical to the shape of the cross section thereof obtained by cutting along the second direction, so there is no structural anisotropy. Therefore, the form birefringence does not occur.

The incident angle of the light beam incident on the imaging optical system 6 shown in FIG. 1 is in a range of about 0° to 35°. Therefore, the above-mentioned result is a level sufficient for anti-reflection performance of the imaging optical system 6.

In this embodiment, the distances between the arbitrary subwave structure 80 and the adjacent subwave structures 81, 82, 83, and 84 which are selected in the short distance order based thereon are expressed by L1, L2, L3, and L4, respectively. In addition, the expressions L1≠L2, L3≠L4, L1≠L4, and L2≠L3 are set. However, the four distances are not necessarily equal to one another and any distances may be equal to one another. In addition, all the distances between the subwave structures do not necessarily satisfy the four expressions and the distances may be varied.

Embodiment 2

Embodiment 2 of the present invention will be described with reference to FIGS. 7 to 13.

A point in this embodiment which is different from Embodiment 1 described earlier is that a subwave structure whose cross sectional shape is a deformed circle is formed in a convex shape. Other structures and optical functions are substantially identical to those of Embodiment 1 and thus the same effect is obtained.

That is, in this embodiment, each of the incident surface 6a1 of the first imaging lens 6a in the imaging optical system 6, the exit surface 6a2 thereof, the incident surface 6b1 of the second imaging lens 6b therein, and the exit surface 6b2 thereof has a special aspherical shape as a base shape. A subwave structural grating 89 shown in FIGS. 7 to 9 is formed in each of the surfaces.

Therefore, reflectance (and transmittance) can be arbitrarily controlled in this embodiment. Thus, Fresnel (surface) reflection caused on each of the incident surface 6a1 of the first imaging lens 6a in the imaging optical system 6, the exit surface 6a2 thereof, the incident surface 6b1 of the second imaging lens 6b therein, and the exit surface 6b2 thereof is suitably adjusted to prevent a multi-reflection light beam generated between the two imaging lenses from reaching the surface to be scanned 7, thereby reducing flare and ghost light which reach the surface to be scanned 7.

Figure 7:
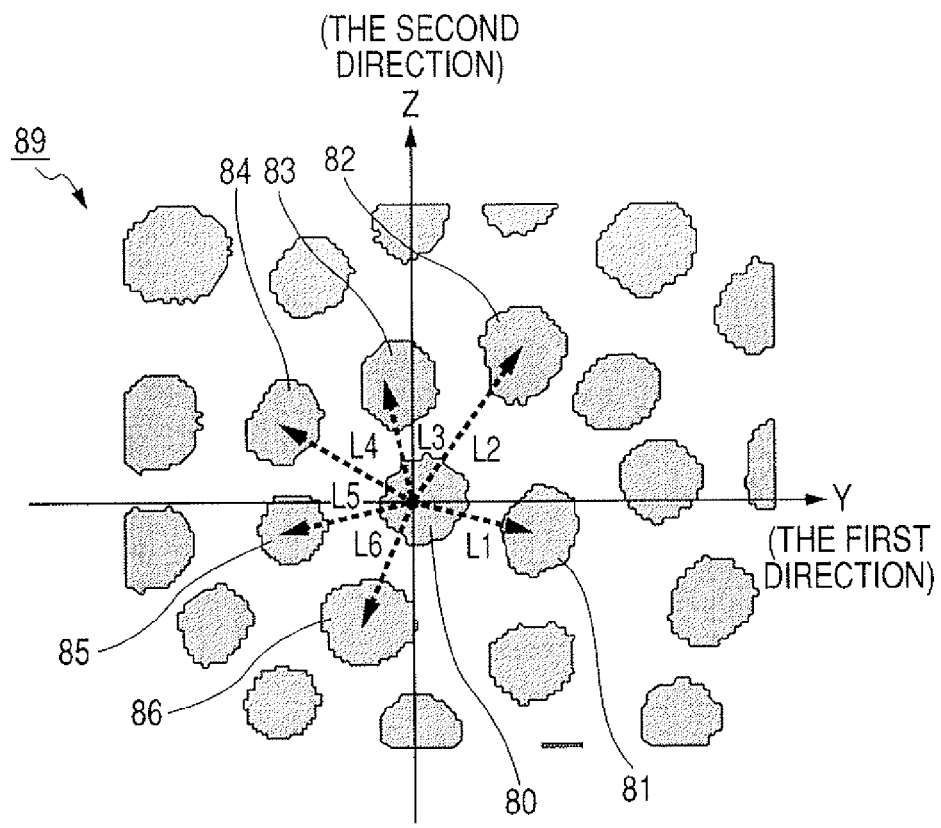
FIG. 7 is a cross sectional view of a principal part of a subwave structural grating according to Embodiment 2 of the present invention.

FIG. 7 is an enlarged view of the exit surface 6a2 of the first imaging lens 6a as viewed from the surface to be scanned 7 side. FIG. 8 is a cross sectional view of a principal part of the exit surface 6a2 which is obtained by cutting along the Y-axis shown in FIG. 7. FIG. 9 is a cross sectional view of a principal part of the exit surface 6a2 which is obtained by cutting along the Z-axis shown in FIG. 7.

Figure 8:
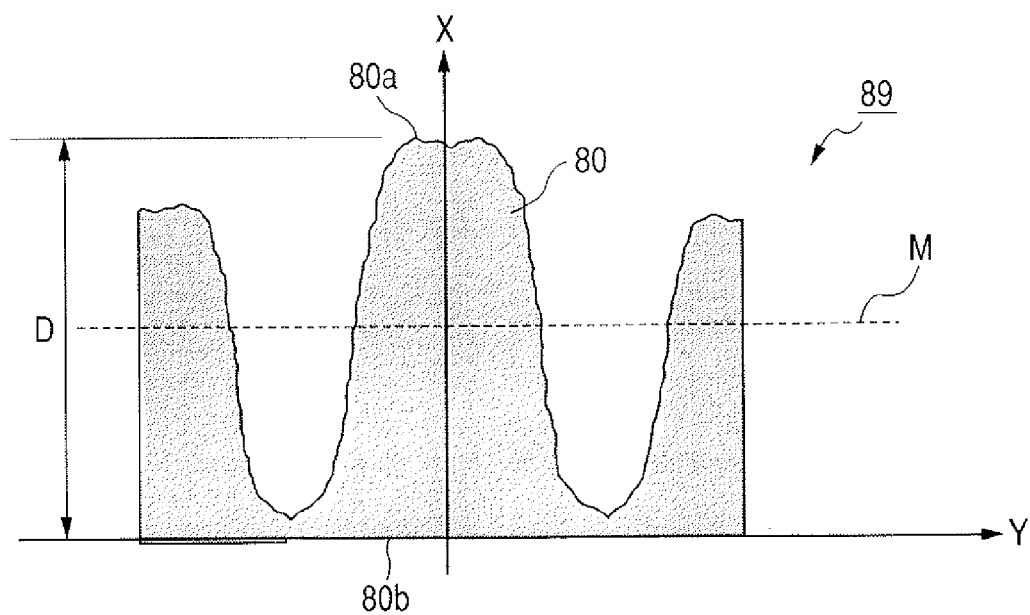
FIG. 8 is a cross sectional view of a principal part of the subwave structural grating according to Embodiment 2 of the present invention.
Figure 9:
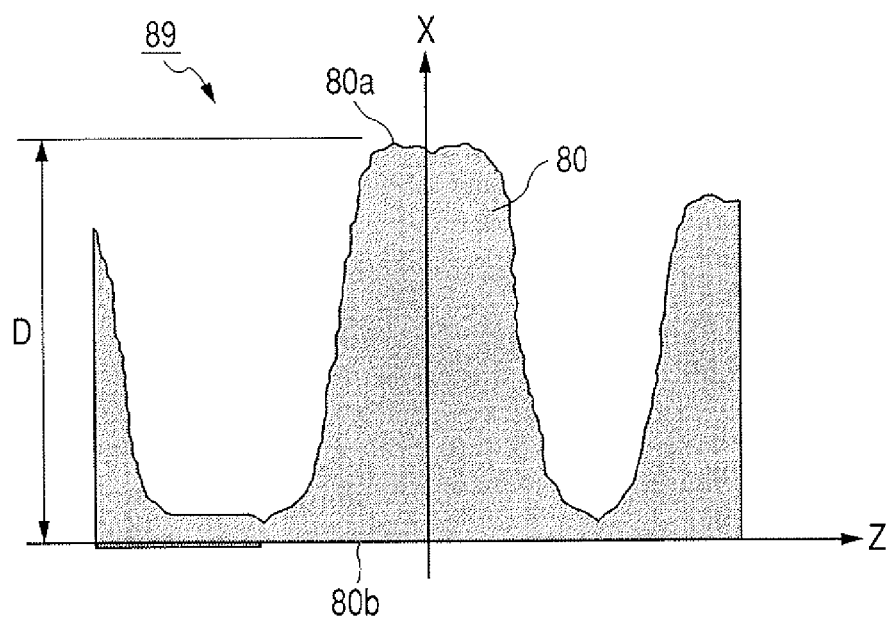
FIG. 9 is a cross sectional view of a principal part of the subwave structural grating according to Embodiment 2 of the present invention.

In each of FIGS. 7, 8, and 9, the coordinate systems X, Y, and Z are set for the arbitrary subwave structure 80. Assume that the arrangement direction corresponding to the first direction based on the subwave structure 80 is the Y-direction. In addition, assume that the arrangement direction corresponding to the second direction which is perpendicular to the arrangement direction corresponding to the first direction and set on the same paper of FIG. 7 is the Z-direction. The optical surface is the Y-Z plane and the normal to the optical surface at the surface vertex becomes the X-direction.

The arbitrary subwave structure 80 is made of the same material as that of the first imaging lens 6a and has a convex shape in which a cross sectional shape thereof is a deformed circle. A ratio between a maximum diameter of the deformed circle and a minimum diameter thereof is preferably set to about two times or less. When the ratio exceeds the two times, as described in Embodiment 1, the shape of the cross section of the arbitrary subwave structure which is obtained by cutting along the first direction is not substantially identical to the shape of the cross section thereof obtained by cutting along the second direction, so structural anisotropy occurs. Therefore, a form birefringence phenomenon becomes significant.

The subwave structure 80 whose cross sectional shape is the deformed circle may be formed in a concave shape.

Here, assume that the height of the convex shape is D. A diameter of the convex shape changes depending on each subwave structure. As shown in FIGS. 8 and 9, the subwave structure 80 has the convex shape whose diameter changes according to a position in the X-direction, which corresponds to the height D. A diameter of a base portion (bottom) 80b of the convex shape is substantially larger than that of a top portion (top surface) 80a thereof. The shape of the cross section of the subwave structure 80 which is obtained by cutting along the first direction is identical to or substantially identical to the shape of the cross section thereof obtained by cutting along the second direction. Therefore, the arbitrary subwave structure 80 has a substantially rotational symmetrical shape.

As shown in FIG. 7, the respective subwave structures are substantially two-dimensionally arranged in the Y-direction and the Z-direction. As is apparent from FIG. 7, a distance between adjacent subwave structures is not constant but varies. Because the respective subwave structures have convex shapes with different sizes, the diameters of the cross sections of the respective subwave structures which are obtained by simultaneous cutting parallel to the optical surface are different from one another. Therefore, the cross sectional areas of the respective subwave structures are not equal to one another.

In this embodiment, as shown in FIG. 7, n (n=6 in this embodiment) adjacent subwave structures 81, 82, 83, 84, 85, and 86 which are selected in the short distance order with respect to the arbitrary subwave structure 80 are two-dimensionally arranged in the Y-direction and the Z-direction.

Assume that the distances between the arbitrary subwave structure 80 and the adjacent subwave structures 81, 82, 83, 84, 85, and 86 are L1, L2, L3, L4, L5, and L6, respectively. The distances between the barycentric positions of the respective adjacent subwave structures 81, 82, 83, 84, 85, and 86 are measured. As is apparent from FIG. 7, the distances L1, L2, L3, L4, L5, and L6 are separately set without interdependence. In addition to this, in this embodiment, the distances in the first direction (Y-direction) are not equal to each other and the distances in the second direction (Z-direction) are not equal to each other.

Here, assume that the distances between the arbitrary subwave structure 80 and the six adjacent subwave structures 81, 82, 83, 84, 85, and 86 which are selected in the short distance order based thereon are $L_i$ (i=1 to n, n=6 in this embodiment), the minimum wavelength of an incident light beam is $\lambda$, the refractive index of a medium located on the incident side of the optical surface is $N_i$, the refractive index of a medium located on the exit side of the optical surface is $N_s$, the incident angle of the light beam incident on the optical surface is $\theta_i$, and the standard deviation of the distances $L_i$ (i=1 to n) is $L\sigma$. When the following expression $$Lave = \sum_{i=1}^{n} Li/n$$

is used, the following conditions are satisfied.

Lave<λ/(Ns+Ni·sin θi)  (1)

Lσ≦80 (nm)  (2)

Therefore, the same effect as that in Embodiment 1 described earlier is obtained.

Next, the cross sectional area of the subwave structure which is obtained by cutting parallel to the optical surface will be described with reference to FIGS. 7, 8, and 9.

As in the case of Embodiment 1, assume that the arbitrary subwave structure 80 and the six adjacent subwave structures 81, 82, 83, 84, 85, and 86 which are selected in the short distance order based on the subwave structure 80 are cut with respect to a cutting plane which is parallel to the optical surface and located at the intermediate height M (broken line of FIG. 8) between the highest portion (top surface) 80*a* of the subwave structure 80 and the lowest portion (bottom) thereof 80*b*. In this case, assume that the cross sectional area of the arbitrary subwave structure 80 is S0, the cross sectional areas of the n adjacent subwave structures 81, 82, 83, 84, 85, and 86 are Si (i=1 to n, n=6 in this embodiment), and the standard deviation of the distances Li (i=1 to n) is Lσ. When the following expressions $$Save = \sum_{i=0}^{n} Si/(n+1)$$

$$Lave = \sum_{i=1}^{n} Li/n$$

are used, the following conditions are satisfied.

0.16≦Save/(K×(Lave)²)≦0.81  (3)

Lσ≦80 (nm)  (2)

where K denotes the constant and satisfies the following condition.

0.87≦K≦1.0

Therefore, the same effect as that in Embodiment 1 described earlier is obtained. As described above, because n=6, K is 0.87.

A denominator of the right-hand side of the conditional expression (3) is (K×(Lave)²) and K is 0.87, so the denominator indicates an average area two times an area surrounded by three adjacent subwave structures, that is, a unit area in the case where convex portions of the subwave structures and concave portions located around the convex portions are combined. As is apparent from FIG. 7, a convex portion of a subwave structure is substantially located within the unit area. Therefore, the right-hand side (Save/(K×(Lave)²)) of the conditional expression (3) indicates the area ratio (average grating area ratio) F of a subwave structural region located on the optical surface.

Now, assume that a used wavelength λ is 780 nm, a height D of a subwave structure is 160 nm, a light beam incident angle θ is 0°, polarized light of an incident light beam is P-polarized light, the average value Lave of the distances between the adjacent subwave structures is 300 (nm), and a refractive index of a glass material is 1.524. In such case, a result obtained by calculating reflectance 0th order light in the subwave structural grating surface using rigorous coupled wave analysis (RCWA) based on the average grating area ratio F is identical to that shown in FIG. 5. Here, for the purpose of simplification, the distance between the adjacent subwave structures is set to 300 (nm) and a variation in distances is assumed to be extremely small. Although the details are omitted here, the height D of the subwave structure which is set to 160 (nm) is a result which is obtained by optimization such that the reflectance becomes minimal in the vicinity of the used wavelength λ of 780 (nm). When the used wavelength λ changes, the height D of the subwave structure may be optimized as appropriate.

In FIG. 5, the reflectance in the case where there are no subwave structures is about 4.4%. On the other hand, in this embodiment, when the above-mentioned conditional expression (3) is satisfied, the reflectance is 2% in the vicinity of λ=780 (nm), so that the reflectance can be reduced by half. More desirably, when the above-mentioned conditional expression (3a) is satisfied, the reflectance can be reduced to about 1% in a range of λ from 650 (nm) to 850 (nm).

Figure 10:
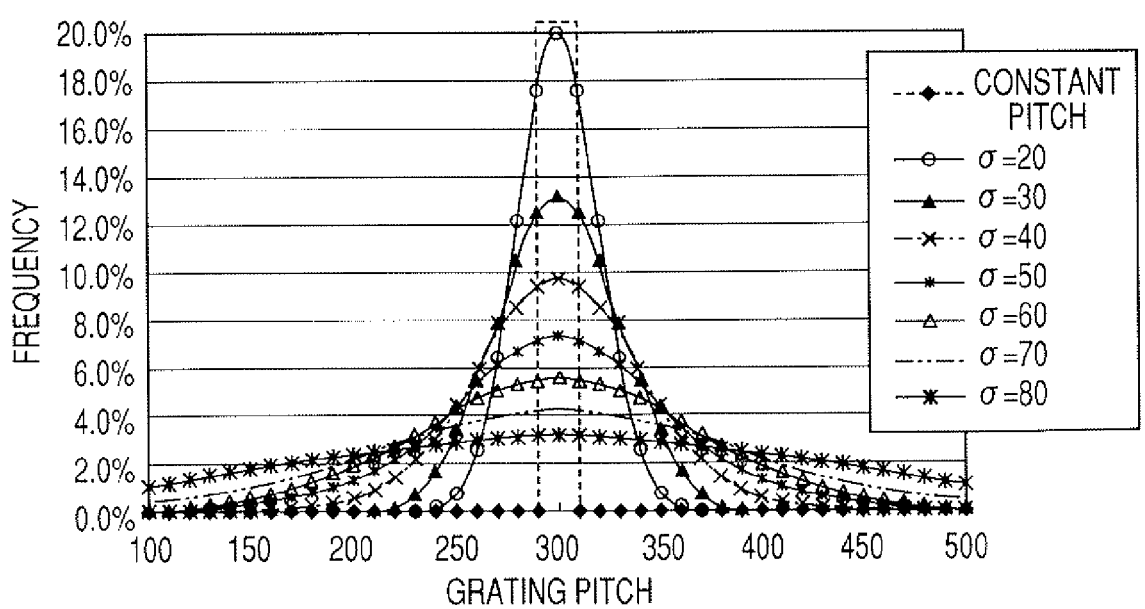
FIG. 10 is a graph showing a relationship between a grating pitch and a frequency according to Embodiment 2 of the present invention.

Next, the case where the distance between the adjacent subwave structures, which is set to 300 (nm), varies will be described with reference to FIGS. 10 and 11.

Assume that the average value Lave of the distances between the adjacent subwave structures is 300 (nm) and the average height D is 160 (nm), and each of variation patterns in distances between the adjacent subwave structures is within a range of 100 (nm) to 500 (nm). When the standard deviation Lσ is changed between 20 (nm) to 80 (nm) so as to satisfy the conditional expression (2), a distribution of the distances between the adjacent subwave structures is obtained as shown in FIG. 10. Then, 0th order spectral transmittance obtained by calculation with respect to each of the variation patterns in distances between the adjacent subwave structures is shown in FIG. 11. As described above, the height D of the subwave structure which is set to 160 (nm) is the result which is obtained by optimization such that the reflectance becomes minimal in the vicinity of the used wavelength λ of 780 (nm). Therefore, as shown in FIG. 11, the transmittance in the vicinity of 780 (nm) becomes higher.

When the distance between the adjacent subwave structures is constantly 300 (nm), the condition for the 0th order grating which is described in Embodiment 1 is satisfied, so the diffraction light other than the 0th order light is not generated and there are only the 0th order reflection light and the 0th order transmission light. Therefore, the 0th order transmission light is generated in a range in which the transmittance does not reach 100% in FIG. 11.

On the other hand, when there are variation patterns in distances between the adjacent subwave structures, the condition for the 0th order grating is not satisfied with respect to a part of the adjacent subwave structures, so that first or more order reflection light and first or more order transmission light is generated. The reason why the transmittance of a variation pattern is lower than that of a constant pitch pattern particularly on a short wavelength side in FIG. 11 is that a small amount of first or more order reflection light and a small amount of first or more order transmission light is generated to cause a transmission loss.

Figure 11:
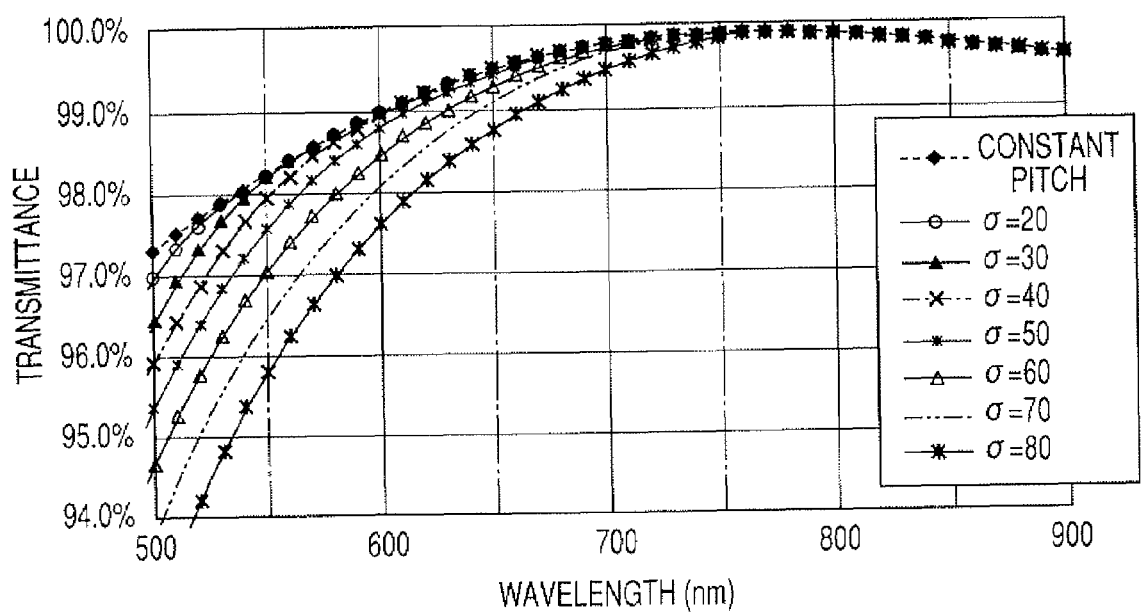
FIG. 11 is a graph showing a relationship between a wavelength and transmittance according to Embodiment 2 of the present invention.

In FIG. 11, in the case where the used wavelength of 700 (nm) to 900 (nm) is expected, when the average value Lave of the distances between the adjacent subwave structures which is set to 300 (nm) which is ½ or less of the used wavelength is varied within the standard deviation Lσ of 80 (nm), the transmittance of 99.5% or more (=transmission loss of 0.5%=⅛ of about 4% which is transmission loss of normal refracting surface) can be achieved.

In FIG. 11, in the case where the used wavelength of 600 (nm) to 900 (nm) is expected, when the average value Lave of the distances between the adjacent subwave structures which is set to 300 (nm) which is ½ or less of the used wavelength is varied within the standard deviation Lσ of 60 (nm), the transmittance of 98% or more (=transmission loss of 2% =a half of about 4% which is transmission loss of normal refracting surface) can be achieved.

When the used wavelength is to be shifted to the shorter wavelength side, the used wavelength may be optimized using any one of the following methods or a combination thereof.

(1) The height D of the subwave structure which is 160 (nm) is optimally set to a lower value to shift the best transmittance to the short wavelength side.

(2) The average value Lave of the distances between the adjacent subwave structures is reduced.

(3) A variation (dispersion) in average value Lave of the distances between the adjacent subwave structures is reduced.

Next, a method of forming the subwave structural grating 8 in the imaging optical system 6 will be described.

The imaging optical system 6 which is normally made of plastic is a plastic mold which is composed of an optical surface which is a free surface and an outer peripheral portion. Such a shape is formed in a die and the plastic mold is manufactured using the die by injection molding or the like.

The subwave structures may be provided in the optical surface of the manufactured plastic mold by a post-process such as electron beam (EB) drawing or transfer using a stumper. A most efficient method is to form portions corresponding to subwave structures in an optical surface of a die for injection molding in advance and simultaneously produce the imaging optical system and the subwave structures by injection molding.

Figure 12:
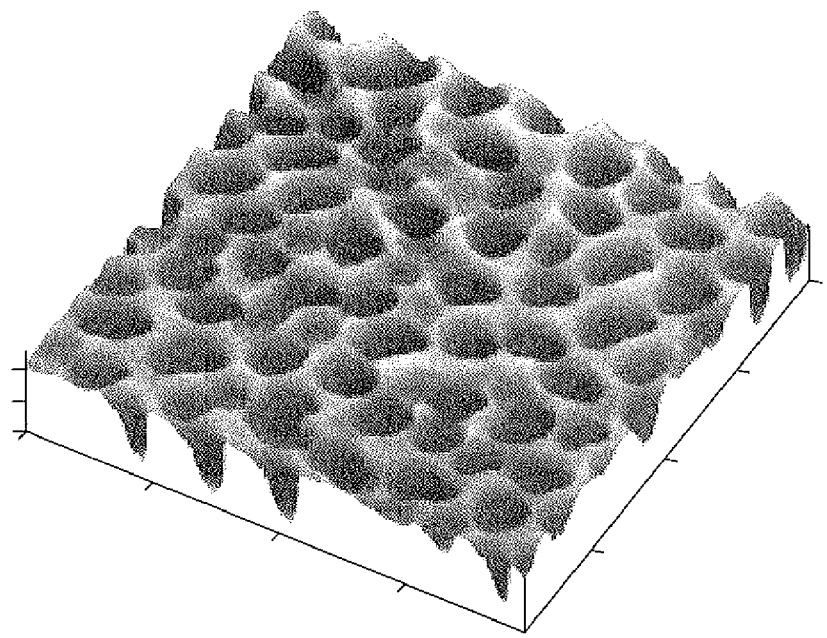
FIG. 12 is an observation view of the subwave structural grating according to Embodiment 2 of the present invention.

FIG. 12 shows an electrophotographic image of the optical surface of an actually produced die. The die is produced by an anodic oxidation alumina method. First, a die in which a portion corresponding to a free surface of the imaging optical system is subjected to cut processing is prepared. A primer layer and an aluminum layer are uniformly formed in order on the free surface by sputtering to obtain a free surface type with aluminum coating. A positive electrode is connected to a portion of a surface other than the free surface. The entire die is coated with a masking tape so as to expose only the free surface, so that the surface other than the free surface is made to be in an insulating and waterproof state by coating. Then, the die is immersed together with a negative electrode in a phosphoric acid water solution. After that, a direct current source is connected to the die and a current is supplied thereto. When the current is being supplied until the amount of supplied current becomes sufficiently weak, a die including fine pores which are arranged in random and located perpendicular to the surface is obtained. Further, the die is immersed in a phosphoric acid water solution to lengthen a porous diameter while it is gradually dissolved, so that a die having a desirable porous shape is obtained.

Figure 13:
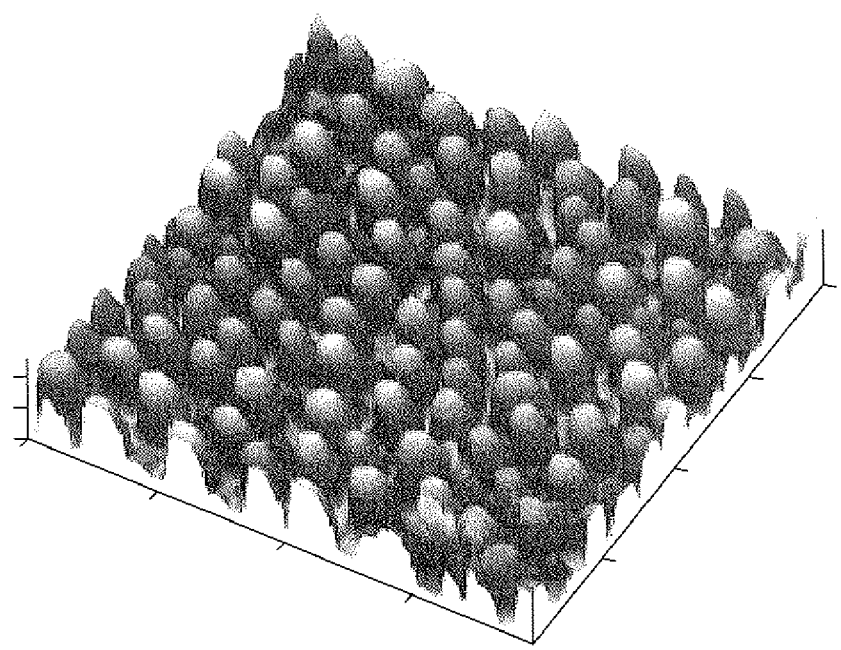
FIG. 13 is an observation view of the subwave structural grating according to Embodiment 2 of the present invention.

The imaging optical system is produced using the obtained die and the optical surface thereof is observed by a scanning type electron microscope, with the result that surface shapes as shown in FIG. 13 are obtained. Columnar convex shapes which are arranged in random over the entire surface are recognized. Barycentric positions of the fine pores are calculated by image processing and the distances between the arbitrary subwave structure and the adjacent subwave structures are calculated based on the calculated barycentric positions. As a result, a variation of the distances between the arbitrary subwave structure and the adjacent subwave structures was about 130 (nm) to 470 (nm). The average value Lave was about 300 (nm) and the standard deviation Lσ was 78 (nm).

A height of each of the columnar convex shapes is measured by an atomic force microscope. A variation of the average heights D was about 110 (nm) to 210 (nm). The average value Lave was about 160 (nm) and the standard deviation Lσ was 29 (nm).

As described above, when the conditional expressions (1) and (2) or/and the conditional expression (3) and (2) are satisfied in each of the embodiments, it is possible to reduce Fresnel (surface) reflection on a lens surface, which causes flare or ghost.

In each of the embodiments, the optical element in which the subwave structural grating is provided is applied to the imaging optical system. However, the present invention is not limited to such a case. The optical element in which the subwave structural grating is provided may be applied to a part of or the entire incident optical system or a part of or the entire both optical systems.

The subwave structure 80 of Embodiment 1 (FIGS. 2 and 3) of the present invention and the subwave structure 80 of Embodiment 2 (FIGS. 7, 8, and 9) of the present invention each exhibit a reflectance reduction effect to an optical scanning device whose scanning angle is equal to or larger than 30° in the main scanning section.

Here, the scanning angle is defined as an angle in the main scanning section, which is formed between the optical axis of the imaging optical system 6 and a principal ray of a light beam which is reflected on and deflected by the deflecting surface 5a of the optical deflector 5.

The subwave structure 80 of the present invention exhibits a reflectance reduction effect to an optical scanning device in which a difference value between a maximum incident angle value and a minimum incident angle value is equal to or larger than 25° or more in a region in which a light beam passes through the first imaging lens 6a and the second imaging lens 6b and reaches an effective scanning region of the surface to be scanned 7 (photosensitive drum surface).

(Image Forming Apparatus)

Figure 14:
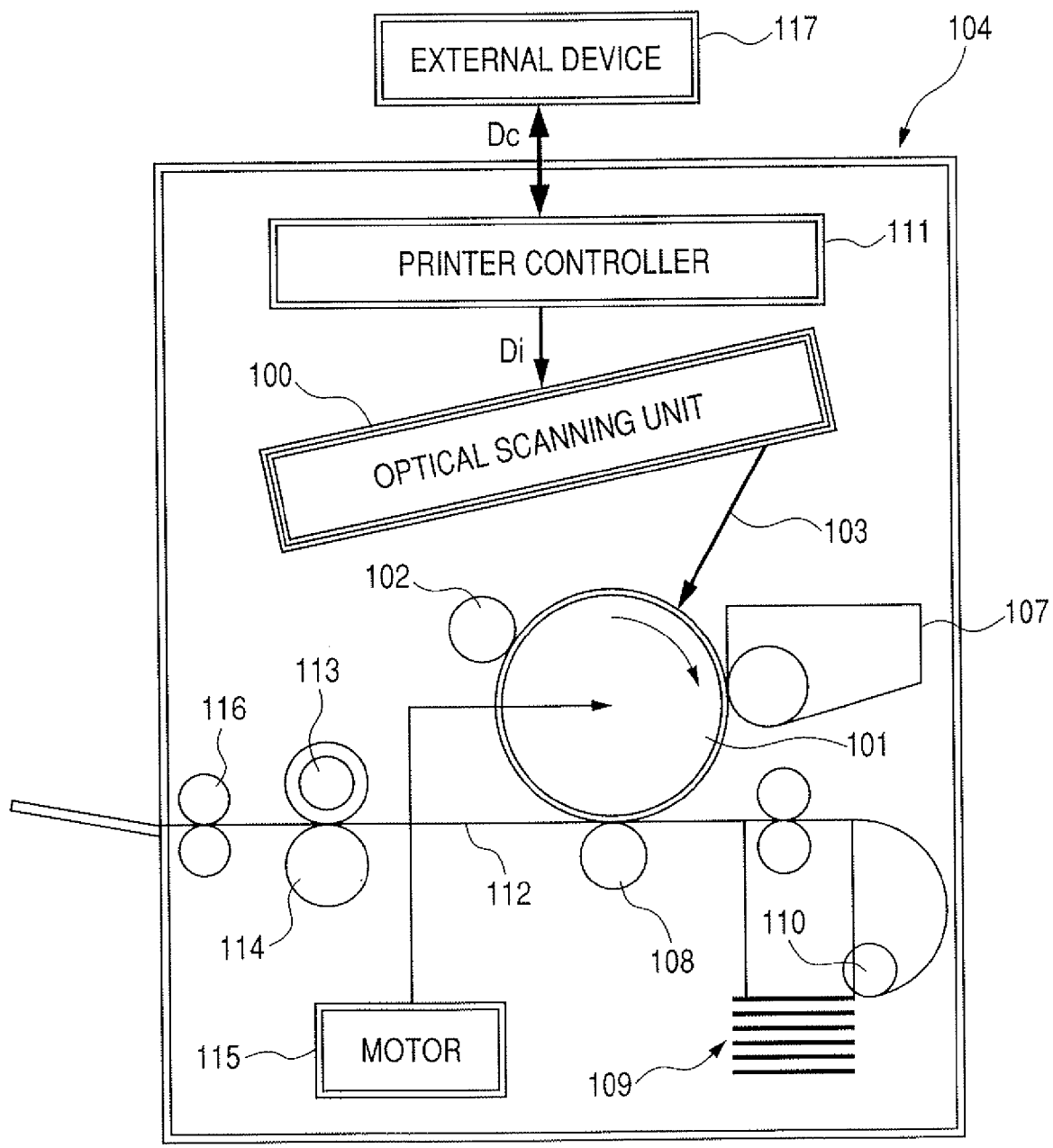
FIG. 14 is a cross sectional view of an image forming apparatus in a sub-scanning section according to an embodiment of the present invention.

FIG. 14 is a sectional view of a principal part of an image forming apparatus in the sub scanning direction according to an embodiment of the present invention. In FIG. 14, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus. The image data Di is inputted to an optical scanning unit 100 having the structure described in Embodiment 1 or 2. A light beam 103 modulated according to the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved relative to the light beam 103 in the sub-scanning direction orthogonal to the main scanning direction. A charging roller 102 for uniformly charging the surface of the photosensitive drum 101 is provided above the photosensitive drum 101 so as to be in contact with the surface thereof. The surface of the photosensitive drum 101 which is charged by the charging roller 102 is irradiated with the light beam 103 for scanning by the optical scanning unit 100.

As described earlier, the light beam 103 is modulated based on the image data Di. The surface of the photosensitive drum 101 is irradiated with the light beam 103 to form an electrostatic latent image thereon. The electrostatic latent image is developed as a toner image by a developing device 107 provided in the downstream side from the irradiation position of the light beam 103 in the rotational direction of the photosensitive drum 101 so as to be in contact with the photosensitive drum 101.

The toner image developed by the developing device 107 is transferred onto a sheet 112 serving as a material to be transferred by a transfer roller 108 provided below the photosensitive drum 101 so as to oppose to the photosensitive drum 101. The sheet 112 is contained in a sheet cassette 109 located in the front (right side in FIG. 14) of the photosensitive drum 101. Manual feed is also possible. A feed roller 110 is provided in the end portion of the sheet cassette 109. The sheet 112 contained in the sheet cassette 109 is sent to a transport path by the feed roller 110.

By the above operation, the sheet 112 to which an unfixed toner image is transferred is further transported to a fixing device located in the rear (left side in FIG. 14) of the photosensitive drum 101. The fixing device is composed of a fixing roller 113 having a fixing heater (not shown) and a pressure roller 114 provided so as to press the fixing roller 113. The sheet 112 transported from the transferring part is heated while it is pressurized with the press-contacting part which is composed of the fixing roller 113 and the pressure roller 114, so that the unfixed toner image on the sheet 112 is fixed. A delivery roller 116 is provided in the rear of the fixing roller 113. The fixed sheet 112 is delivered to the outside of the image forming apparatus by the delivery roller 116.

Although not shown in FIG. 14, the printer controller 111 conducts not only data conversion described earlier but also control of each part of the image forming apparatus, which is represented by the motor 115, control of a polygon motor in the optical scanning unit as described later, and the like.

(Color Image Forming Apparatus)

Figure 15:
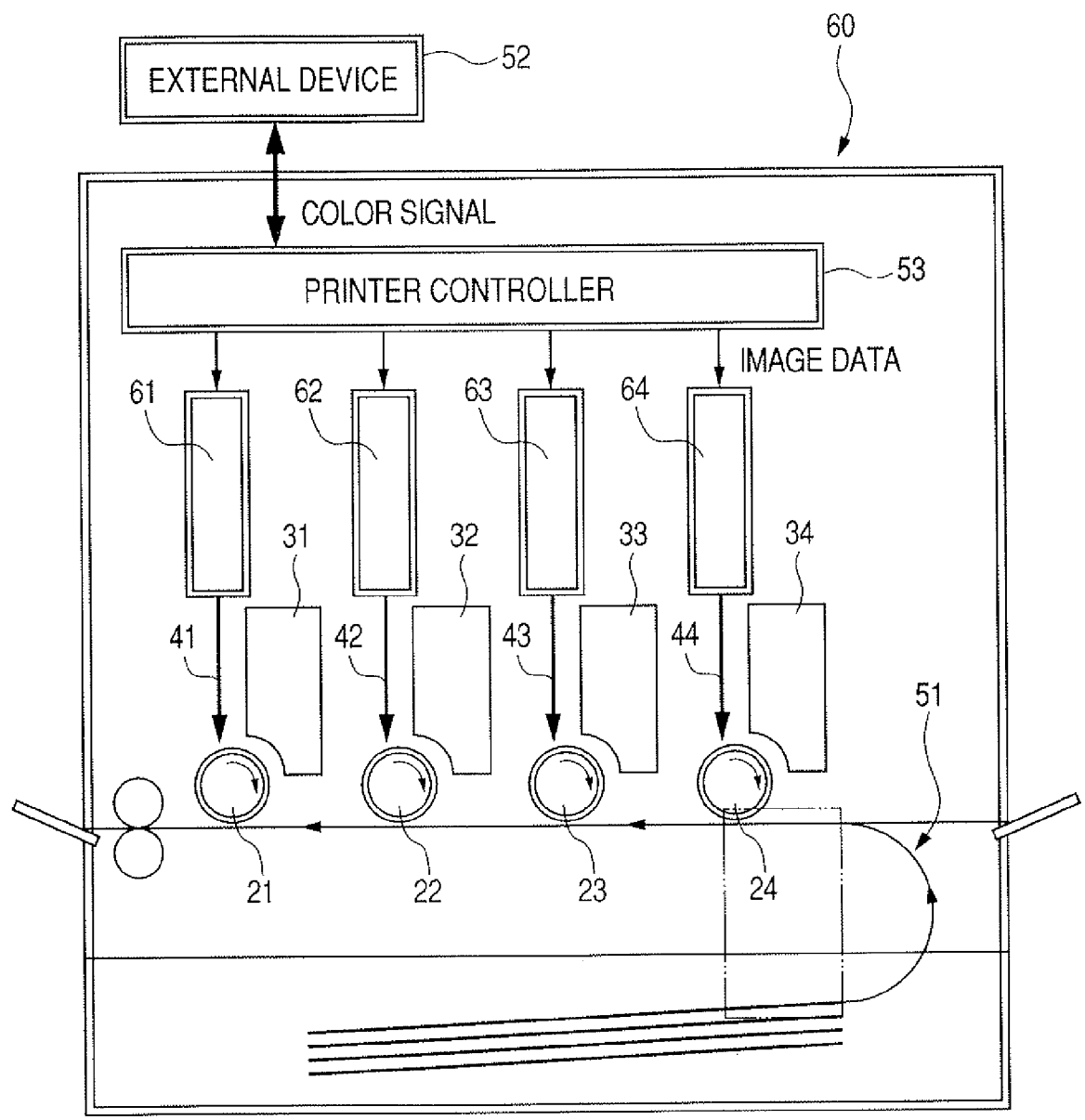
FIG. 15 is a schematic diagram of a principal part of a color image forming apparatus according to an embodiment of the present invention.
Figure 16:
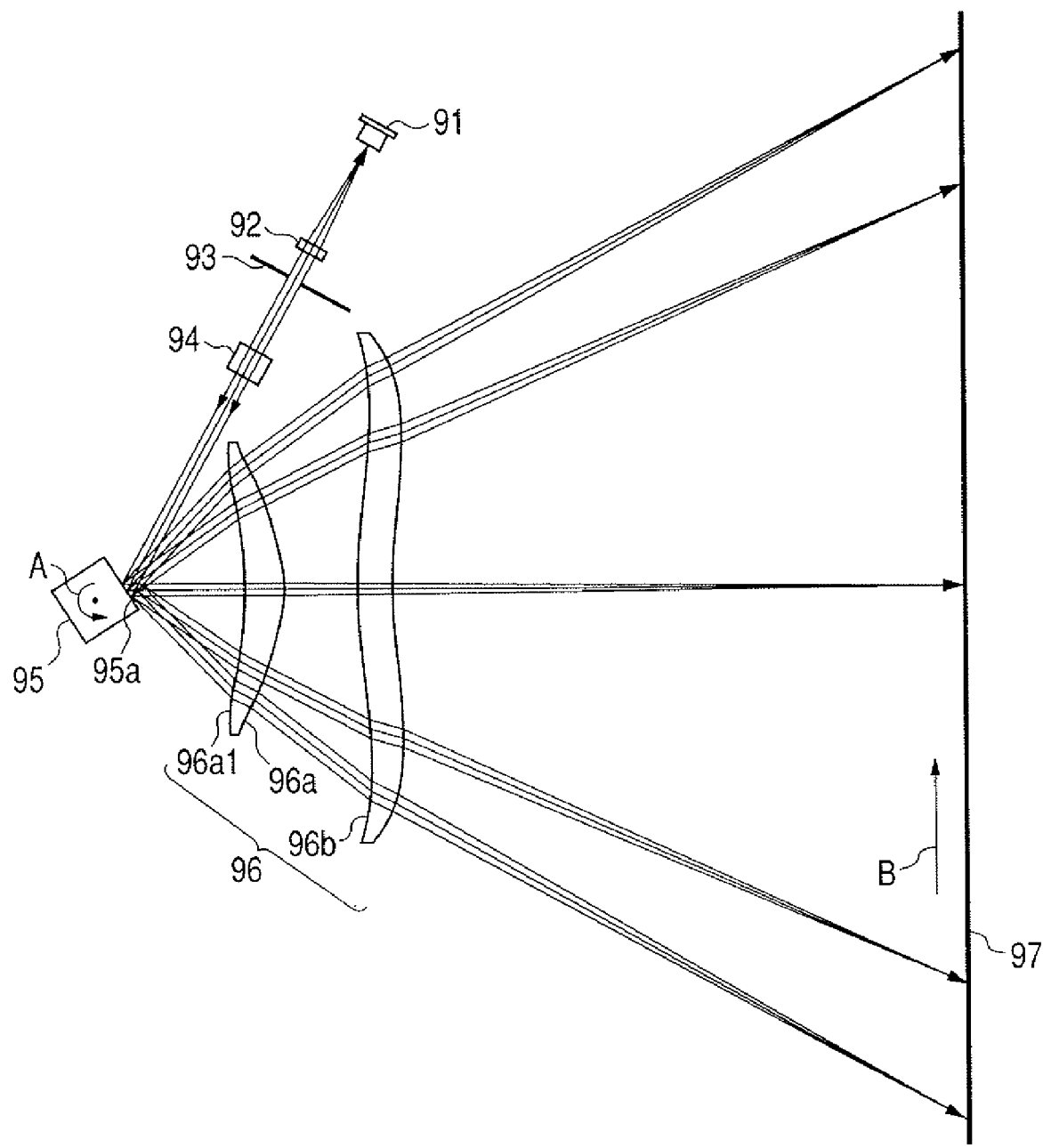
FIG. 16 is a schematic diagram of a principal part of a conventional optical scanning device.

FIG. 15 is a schematic diagram of a principal part of a color image forming apparatus according to an embodiment of the present invention. This is a tandem type color image forming apparatus in which four optical scanning devices are arranged to record image information in parallel on the surface of the photosensitive drum serving as the image bearing member. In FIG. 15, reference numeral 60 denotes a color image forming apparatus, 61, 62, 63, and 64 each denote the optical scanning device having the structure described in Embodiment 1 or 2, 21, 22, 23, and 24 each denote a photosensitive drum serving as an image bearing member, 31, 32, 33, and 34 each denote a developing unit, and 51 denotes a transport belt.

In FIG. 15, respective color signals of R (red), G (green), and B (blue) are inputted from an external device 52 such as a personal computer to the color image forming apparatus 60. The color signals are converted into respective image data (dot data) of C (cyan), M (magenta), Y (yellow), and B (black) by a printer controller 53 in the color image forming apparatus. These image data are separately inputted to the optical scanning devices 61, 62, 63, and 64. Light beams 41, 42, 43, and 44 which are modulated according to the respective image data are emitted from the optical scanning devices. The photosensitive surfaces of the photosensitive drums 21, 22, 23, and 24 are scanned with the light beams in the main scanning direction.

According to the color image forming apparatus of this embodiment, the four optical scanning devices (61, 62, 63, and 64) are arranged corresponding to the respective colors of C (cyan), M (magenta), Y (yellow), and B (black). The image signals (image information) are recorded in parallel on the surfaces of the photosensitive drums 21, 22, 23, and 24, thereby printing a color image at high speed.

According to the color image forming apparatus of this embodiment, as described above, the latent images of the respective colors are formed on the corresponding surfaces of the photosensitive drums 21, 22, 23, and 24 using the light beams based on the respective image data from the four scanning optical devices 61, 62, 63, and 64. After that, the multi-transfer is performed on a recording member to produce a full color image.

For example, a color image reading apparatus including a CCD sensor may be used as the external device 52. In this case, the color image reading apparatus and the color image forming apparatus 60 compose a color digital copying machine.

This application claims priority from Japanese Patent Application No. 2005-011713 filed Jan. 19, 2005, which is hereby incorporated by reference herein.

What is claimed is:

1. An optical element comprising a plurality of subwave structures which have an anti-reflection function for a light beam incident on an optical surface and are two-dimensionally arranged, wherein when directions orthogonal to each other within a plane including a tangent line of a vertex of the optical surface are set as a first direction and a second direction, distances between each of the subwave structures changes in at least one of the first direction and the second direction, and an arbitrary subwave structure of the subwave structures is located with a state in which a distance between the arbitrary subwave structure and one of the subwave structures which is closest to the arbitrary subwave structure is shorter than ½ of an average wavelength of the light beam incident on the optical surface, wherein the following conditional expressions are satisfied, $Lave < \lambda/(Ns + Ni \cdot \sin \theta i)$, $L\sigma \leq 80$ (nm), where Li (i=1 to n) represent distances between the arbitrary subwave structure and n subwave structures selected in an increasing order of the distance from the arbitrary subwave structure to each of the n subwave structures, λ represents a minimum wavelength of the light beam incident on the optical surface, Ni represents a refractive index of a medium of a subwave structure located on an incident side of the optical surface, Ns represents a refractive index of a medium of a subwave structure located on an exit side of the optical surface, θi represents an incident angle of the light beam incident on the optical surface, Lσ represents a standard deviation of the distances Li (i=1 to n), and a relationship $$Lave = \sum_{i=1}^{n} Li/n$$

is used.

2. An optical element according to claim 1, wherein each of the subwave structures has one of a convex shape and a concave shape.

3. An optical element comprising a plurality of subwave structures which have an anti-reflection function for a light beam incident on an optical surface and are two-dimensionally arranged, wherein when directions orthogonal to each other within a plane including a tangent line of a vertex of the optical surface are set as a first direction and a second direction, distances between each of the subwave structures changes in at least one of the first direction and the second direction and an arbitrary subwave structure of the subwave structures is located with a state in which a distance between the arbitrary subwave structure and one of the subwave structures which is closest to the arbitrary subwave structure is shorter than ½ of an average wavelength of the light beam incident on the optical surface, wherein the following conditional expressions are satisfied, $$0.16 \leq Save/(K \times (Lave)^2) \leq 0.81$$

$$L\sigma \leq 80 \text{ (nm)}$$

where K denotes a constant which satisfies $0.87 \leq K \leq 1.0$, Li (i=1 to n) denote distances between the arbitrary subwave structure and n subwave structures selected in an increasing order of the distance from the arbitrary subwave structure to each of the n subwave structures, S0 denotes a cross sectional area of the arbitrary subwave structure with respect to an arbitrary cutting plane parallel to the plane including the tangent line of the vertex of the optical surface, Si (i=1 to n) represents cross sectional areas of the n subwave structures, and Lσ represents a standard deviation of the distances Li (i=1 to n), and the following relationships $$Save = \sum_{i=0}^{n} Si/(n+1)$$

$$Lave = \sum_{i=1}^{n} Li/n$$

are used.

4. An optical element according to claim 3, wherein each of the subwave structures has one of a convex shape and a concave shape and the arbitrary cutting plane is a cutting plane located at an intermediate position between a top surface and a bottom surface of the one of the convex shape and the concave shape.

5. An optical element according to claim 1 or 3, wherein n is a number in a range of 4 to 6.

6. An optical element according to claim 1 or 3, wherein a cross sectional shape of the arbitrary subwave structure which includes a normal to the vertex of the optical surface and is obtained by cutting in the first direction is identical to or substantially identical to a cross sectional shape of the arbitrary subwave structure which includes the normal to the vertex of the optical surface and is obtained by cutting in the second direction.

7. An optical element according to claim 1 or 3, wherein the subwave structures comprise subwave structures in which cross sectional areas thereof with respect to a cutting plane parallel to the plane including the tangent line of the vertex of the optical surface are not equal to one another.

8. An optical element according to claim 1 or 3, wherein the light beam incident on the optical surface of the optical element is predetermined polarized light and a polarization direction of the polarized light is aligned with or substantially aligned with one of the first direction and the second direction.

9. An optical scanning device, comprising:
light source means;
deflecting means;
an incident optical system for guiding light beam emitted from the light source means to the deflecting means; and
an imaging optical system for guiding the light beam from the deflecting means to a surface to be scanned,
wherein at least one of the incident optical system and the imaging optical system includes the optical element according to claim 1 or 3.

10. An optical scanning device according to claim 9, wherein the light beam emitted from the light source means is linearly polarized light and an oscillation wavelength of the light beam is in a range of 400 nm to 850 nm.

11. An image forming apparatus, comprising:
the optical scanning device according to claim 10;
a photosensitive member located on the surface to be scanned;
a developing device for developing, as a toner image, an electrostatic latent image formed on the photosensitive member by scanning with light beam by the optical scanning device;
a transferring device for transferring the developed toner image to a material to be transferred; and
a fixing device for fixing the transferred toner image to the material to be transferred.

12. An image forming apparatus, comprising:
the optical scanning device according to claim 10; and
a printer controller for converting code data inputted from an external device into an image signal and outputting the image signal to the optical scanning device.

13. A color image forming apparatus, comprising a plurality of image bearing members which are arranged on the respective surface to be scanned in the optical scanning device according to claim 10 and form different color images.

14. A color image forming apparatus according to claim 13, further comprising a printer controller for converting a color signal inputted from an external device into different color image data and outputting the color image data to the optical scanning devices.

* * * * *

UNITED STATES PATENT AND TRADEMARK OFFICE
CERTIFICATE OF CORRECTION

| | |
|---|---|
| PATENT NO. | : 7,362,487 B2 |
| APPLICATION NO. | : 11/275528 |
| DATED | : April 22, 2008 |
| INVENTOR(S) | : Kazumi Kimura |

It is certified that error appears in the above-identified patent and that said Letters Patent is hereby corrected as shown below:

COLUMN 1:
Line 30, "cross sectional" should read --cross-sectional--.
Line 32, "cross sectional" should read --cross-sectional--.

COLUMN 3:
Line 1, "about" should be deleted.

COLUMN 4:
Line 4, "cross sectional" should read --cross-sectional--.
Line 67, "cross sectional" should read --cross-sectional--.

COLUMN 5:
Line 32, "cross sectional" should read --cross-sectional--.
Line 35, "cross" should read --cross- --.
Line 41, "cross sectional" should read --cross-sectional--.

COLUMN 6:
Line 51, "cross sectional" should read --cross-sectional--.
Line 53, "cross sectional" should read --cross-sectional--.
Line 56, "cross sectional" should read --cross-sectional--.

COLUMN 7:
Line 1, "cross sectional" should read --cross-sectional--.
Line 4, "cross sectional" should read --cross-sectional--.
Line 7, "cross sectional" should read --cross-sectional--.
Line 20, "cross sectional" should read --cross-sectional--.
Line 52, "cross sectional" should read --cross-sectional--.

COLUMN 9:
Line 48, "cross sectional" should read --cross-sectional--.

COLUMN 10:
Line 28, "cross sec-" should be --cross-sec- --.

UNITED STATES PATENT AND TRADEMARK OFFICE
CERTIFICATE OF CORRECTION

| | |
|---|---|
| PATENT NO. | : 7,362,487 B2 |
| APPLICATION NO. | : 11/275528 |
| DATED | : April 22, 2008 |
| INVENTOR(S) | : Kazumi Kimura |

It is certified that error appears in the above-identified patent and that said Letters Patent is hereby corrected as shown below:

COLUMN 12:
Line 56, "cross sectional" should read --cross-sectional--.
Line 66, "cross" should read --cross- --.

COLUMN 13:
Line 1, "cross sectional" should read --cross-sectional--.

COLUMN 15:
Line 23, "cross sectional" should read --cross-sectional--.
Line 46, "cross sectional" should read --cross-sectional--.
Line 48, "cross sectional" should read --cross-sectional--.
Line 64, "cross sectional" should read --cross-sectional--.

COLUMN 16:
Line 9, "cross sectional" should read --cross-sectional--.
Line 35, "cross" should read --cross- --.

COLUMN 17:
Line 15, "cross sectional" should read --cross-sectional--.
Line 27, "cross sectional" should read --cross-sectional--.
Line 28, "cross sectional" should read --cross-sectional--.

COLUMN 22:
Line 42, "changes" should read --change,--.
Line 56, "represent" should read --represents--.

COLUMN 23:
Line 19, "changes" should read --change--.
Line 34, "denote" should read --denotes--.
Line 37, "cross" should read --cross- --.
Line 40, "cross sectional" should read --cross-sectional--.
Line 42, "n),and" should read --n), and--.
Line 67, "cross sectional" should read --cross-sectional--.

UNITED STATES PATENT AND TRADEMARK OFFICE
CERTIFICATE OF CORRECTION

PATENT NO. : 7,362,487 B2
APPLICATION NO. : 11/275528
DATED : April 22, 2008
INVENTOR(S) : Kazumi Kimura It is certified that error appears in the above-identified patent and that said Letters Patent is hereby corrected as shown below:

COLUMN 24:
Line 3, "cross sectional" should read --cross-sectional--.
Line 9, "cross sectional" should read --cross-sectional--.

Signed and Sealed this

Tenth Day of February, 2009

JOHN DOLL
*Acting Director of the United States Patent and Trademark Office*